(12) United States Patent
Zhang et al.

(10) Patent No.: US 8,995,291 B2
(45) Date of Patent: Mar. 31, 2015

(54) TRACKING LOOP DESIGN FOR UNICAST AND MULTICAST/BROADCAST SIGNALS

(75) Inventors: Xiaoxia Zhang, San Diego, CA (US);
Gordon Kent Walker, Poway, CA (US);
Jun Wang, La Jolla, CA (US);
Zhengwei Liu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 688 days.

(21) Appl. No.: 13/238,548

(22) Filed: Sep. 21, 2011

(65) Prior Publication Data

US 2012/0314591 A1   Dec. 13, 2012

Related U.S. Application Data

(60) Provisional application No. 61/495,587, filed on Jun. 10, 2011.

(51) Int. Cl.
| | |
|---|---|
| *G01R 31/08* | (2006.01) |
| *H04L 27/26* | (2006.01) |
| *H04L 12/18* | (2006.01) |
| *H04B 7/06* | (2006.01) |

(52) U.S. Cl.
CPC .......... *H04L 27/2675* (2013.01); *H04L 12/189* (2013.01); *H04L 27/266* (2013.01); *H04L 27/2665* (2013.01); *H04L 27/2655* (2013.01); *H04B 7/068* (2013.01)
USPC ............ 370/252; 370/436; 370/344; 370/328

(58) Field of Classification Search
None
See application file for complete search history.

(56) References Cited

U.S. PATENT DOCUMENTS

| | | | |
|---|---|---|---|
| 8,279,791 B2 * | 10/2012 | Ma et al. | 370/312 |
| 2004/0116121 A1 * | 6/2004 | Sendonaris | 455/441 |
| 2007/0060095 A1 * | 3/2007 | Subrahmanya et al. | 455/343.1 |

(Continued)

FOREIGN PATENT DOCUMENTS

| | | |
|---|---|---|
| WO | 2005074305 A1 | 8/2005 |
| WO | 2010005036 A1 | 1/2010 |
| WO | 2011057257 | 5/2011 |
| WO | 2011063291 | 5/2011 |

OTHER PUBLICATIONS

Ge, et al., "A Novel Carrier Frequency Offset Tracking Scheme in MQAM-OFDM Systems," 5th International Conference on Wireless Communications, Networking and Mobile Computing (WiCom '09), Sep. 2009, pp. 1-4.

(Continued)

*Primary Examiner* — Bob Phunkulh
(74) *Attorney, Agent, or Firm* — Arent Fox LLP

(57) ABSTRACT

A method, an apparatus, and a computer program product for wireless communication are provided. In a first configuration, the apparatus maintains a first set of tracking loops associated with unicast signals and a second set of tracking loops associated with multicast/broadcast signals. In addition, the apparatus decoding at least one of a received unicast signal based on the first set of tracking loops or a received multicast/broadcast signal based on the second set of tracking loops. In a second configuration, the apparatus maintains a TTL and a FTL associated with unicast signals based only on received unicast signals. In addition, the apparatus receives a multicast/broadcast signal and decodes the received multicast/broadcast signal based on the TTL and the FTL maintained based only on the received unicast signals.

56 Claims, 17 Drawing Sheets

(56) References Cited

U.S. PATENT DOCUMENTS

| | | | |
|---|---|---|---|
| 2008/0039042 A1* | 2/2008 | Ciccarelli et al. | 455/234.1 |
| 2009/0080429 A1* | 3/2009 | Iraninejad et al. | 370/392 |
| 2009/0141832 A1 | 6/2009 | Mudulodu et al. | |
| 2010/0232488 A1 | 9/2010 | Song et al. | |
| 2010/0260154 A1* | 10/2010 | Frank et al. | 370/336 |
| 2011/0092231 A1 | 4/2011 | Yoo et al. | |
| 2011/0111781 A1 | 5/2011 | Chen et al. | |
| 2011/0116438 A1 | 5/2011 | Tsunekawa et al. | |
| 2011/0165834 A1 | 7/2011 | Hart et al. | |
| 2011/0170498 A1* | 7/2011 | Liu et al. | 370/329 |
| 2011/0286376 A1 | 11/2011 | Yoo et al. | |

OTHER PUBLICATIONS

Dahlman Erik: "36 Evolution: HSPA and LIE for Mobile Broadband", Jan. 1, 2008, Academic Press, Great Britain, XP002687953, pp. 378-382.

International Search Report and Written Opinion—PCT/US2012/040802—ISA/EPO—Dec. 6, 2012.

Motorola, "MIMO RS Structure for Unicast/MBMS-Mixed Scenarios", 3GPP Draft; R1-071436—MIMO RS Structure for UnicastMBMS-Mixed Scenarios, 3rd Generation Partnership Project (3GPP), Mobile Competence Centre; 650, Route Des Lucioles; F-06921 Sophia-Antipolis Cedex, France; vol. RAN WG1, no. St. Julian, Malta;; Apr. 3, 2007, XP050105374, [retrieved on Apr. 3, 2007].

Motorola, "UE Capability and MBSFN", 3GPP Draft; R2-073532, 3rd Generation Partnership Project (3GPP), Mobile Competence Centre; 650, Route Des Lucioles; F-06921 Sophia-Anti Polis Cedex, France; vol. RAN WG2, no. Athens, Greece; Aug. 15, 2007, XP050136227, [retrieved on Aug. 15, 2007].

Partial International Search Report—PCT/US2012/040802—International Search Authority European Patent Office Oct. 1, 2012.

\* cited by examiner ically to communication systems, and more particularly, to tracking loop design for unicast and multicast/broadcast signals.

TRACKING LOOP DESIGN FOR UNICAST AND MULTICAST/BROADCAST SIGNALS

CROSS-REFERENCE TO RELATED APPLICATION(S)

This application claims the benefit of U.S. Provisional Application Ser. No. 61/495,587, entitled "TRACKING LOOP DESIGN FOR UNICAST AND MULTICAST/BROADCAST SIGNALS" and filed on Jun. 10, 2011, which is expressly incorporated by reference herein in its entirety.

BACKGROUND

1. Field

The present disclosure relates generally to communication systems, and more particularly, to tracking loop design for unicast and multicast/broadcast signals.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided. The apparatus maintains a first set of tracking loops associated with unicast signals and maintains a second set of tracking loops associated with multicast/broadcast signals. The apparatus decodes at least one of a received unicast signal based on the first set of tracking loops or a received multicast/broadcast signal based on the second set of tracking loops.

In an aspect of the disclosure, a method, a computer program product, and an apparatus are provided. The apparatus maintains a time tracking loop and a frequency tracking loop associated with unicast signals based only on received unicast signals. The apparatus receiving a multicast/broadcast signal and decodes the received multicast/broadcast signal based on the time tracking loop and the frequency tracking loop maintained based only on the received unicast signals.

DETAILED DESCRIPTION

Figure 1:
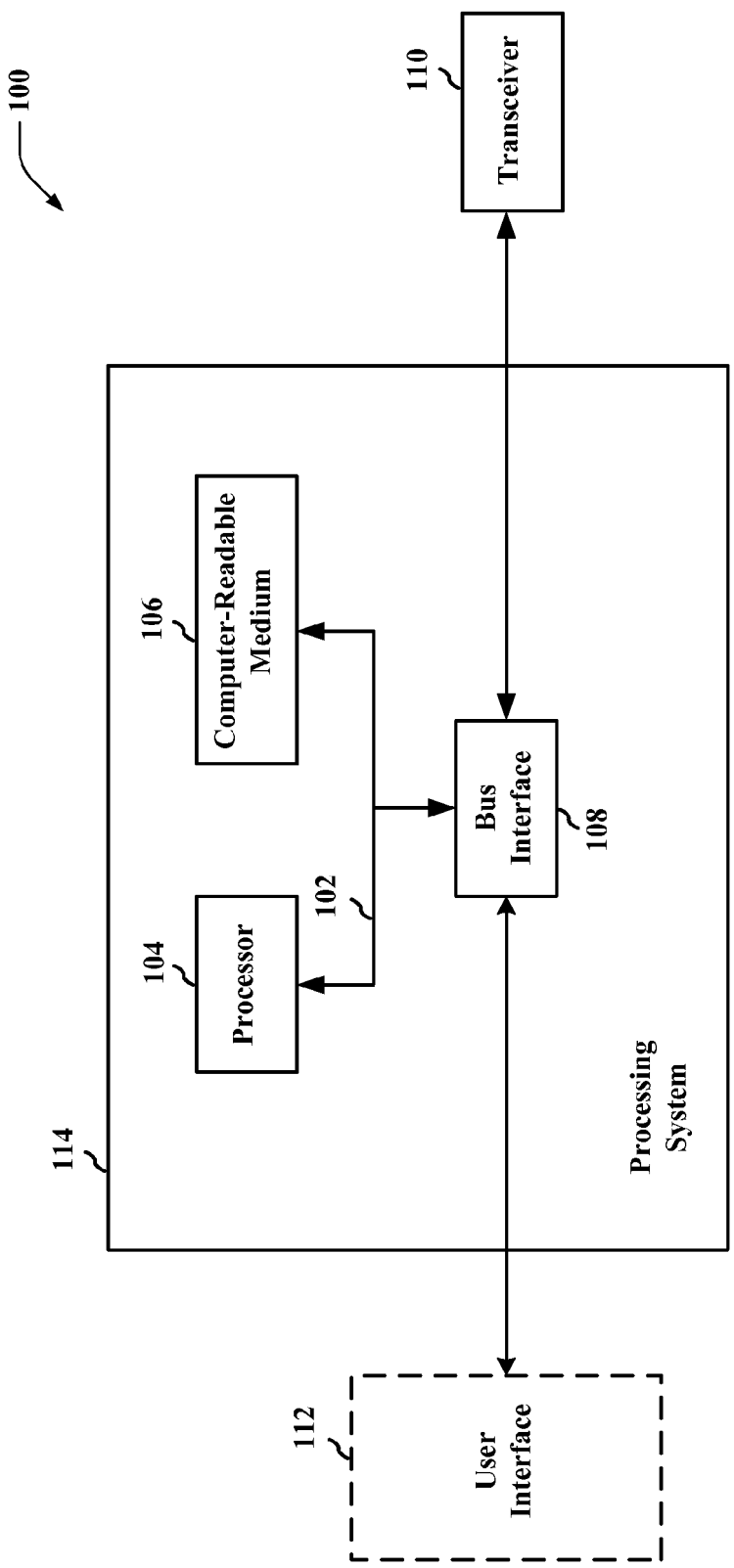
FIG. 1 is a diagram illustrating an example of a hardware implementation for an apparatus employing a processing system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a conceptual diagram illustrating an example of a hardware implementation for an apparatus 100 employing a processing system 114. In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Figure 2:
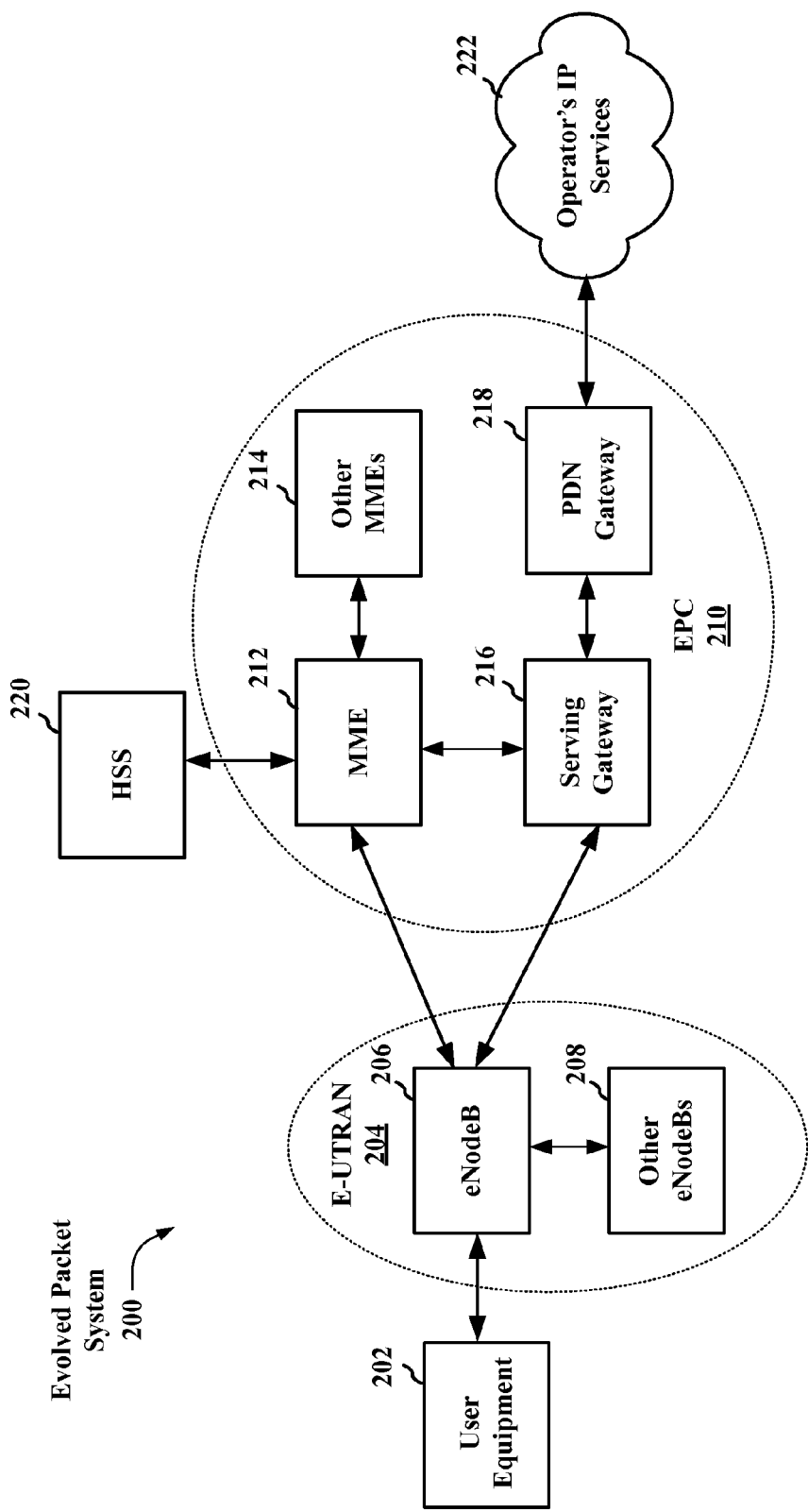
FIG. 2 is a diagram illustrating an example of a network architecture.

FIG. 2 is a diagram illustrating an LTE network architecture 200 employing various apparatuses 100 (See FIG. 1). The LTE network architecture 200 may be referred to as an Evolved Packet System (EPS) 200. The EPS 200 may include one or more user equipment (UE) 202, an Evolved UMTS Terrestrial Radio Access Network (E-UTRAN) 204, an Evolved Packet Core (EPC) 210, a Home Subscriber Server (HSS) 220, and an Operator's IP Services 222. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 206 and other eNBs 208. The eNB 206 provides user and control plane protocol terminations toward the UE 202. The eNB 206 may be connected to the other eNBs 208 via an X2 interface (e.g., backhaul). The eNB 206 may also be referred to by those skilled in the art as a base station, a base transceiver station, a radio base station, a radio transceiver, a transceiver function, a basic service set (BSS), an extended service set (ESS), or some other suitable terminology. The eNB 206 provides an access point to the EPC 210 for a UE 202. Examples of UEs 202 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 202 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 206 is connected by an S1 interface to the EPC 210. The EPC 210 includes a Mobility Management Entity (MME) 212, other MMEs 214, a Serving Gateway 216, and a Packet Data Network (PDN) Gateway 218. The MME 212 is the control node that processes the signaling between the UE 202 and the EPC 210. Generally, the MME 212 provides bearer and connection management. All user IP packets are transferred through the Serving Gateway 216, which itself is connected to the PDN Gateway 218. The PDN Gateway 218 provides UE IP address allocation as well as other functions. The PDN Gateway 218 is connected to the Operator's IP Services 222. The Operator's IP Services 222 may include the Internet, the Intranet, an IP Multimedia Subsystem (IMS), and a PS Streaming Service (PSS).

Figure 3:
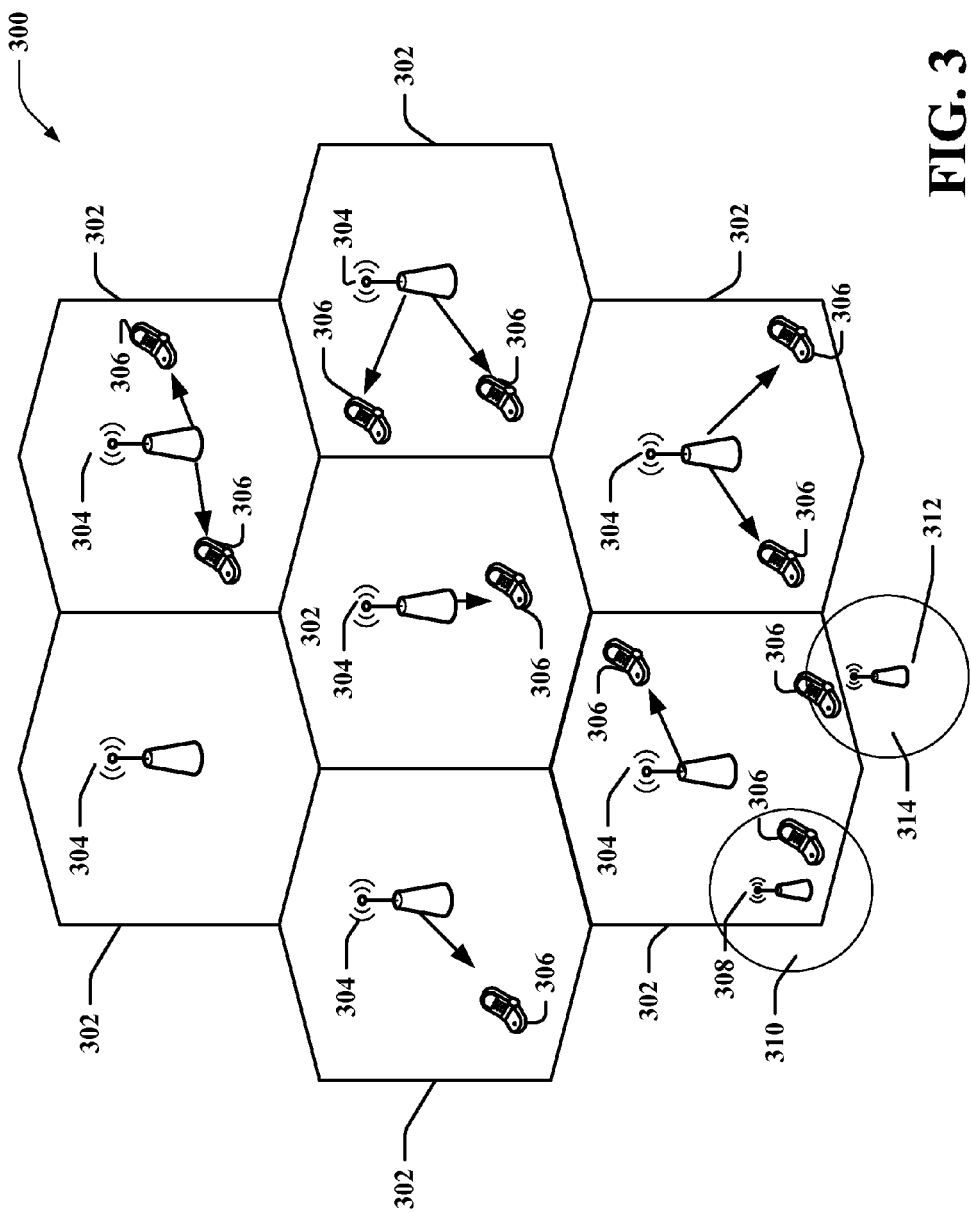
FIG. 3 is a diagram illustrating an example of an access network.

FIG. 3 is a diagram illustrating an example of an access network in an LTE network architecture. In this example, the access network 300 is divided into a number of cellular regions (cells) 302. One or more lower power class eNBs 308, 312 may have cellular regions 310, 314, respectively, that overlap with one or more of the cells 302. The lower power class eNBs 308, 312 may be femto cells (e.g., home eNBs (HeNBs)), pico cells, or micro cells. A higher power class or macro eNB 304 is assigned to a cell 302 and is configured to provide an access point to the EPC 210 for all the UEs 306 in the cell 302. There is no centralized controller in this example of an access network 300, but a centralized controller may be used in alternative configurations. The eNB 304 is responsible for all radio related functions including radio bearer control, admission control, mobility control, scheduling, security, and connectivity to the serving gateway 216 (see FIG. 2).

The modulation and multiple access scheme employed by the access network 300 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNB 304 may have multiple antennas supporting MIMO technology. The use of MIMO technology enables the eNB 304 to exploit the spatial domain to support spatial multiplexing, beamforming, and transmit diversity.

Spatial multiplexing may be used to transmit different streams of data simultaneously on the same frequency. The data steams may be transmitted to a single UE 306 to increase the data rate or to multiple UEs 306 to increase the overall system capacity. This is achieved by spatially precoding each data stream (i.e., applying a scaling of an amplitude and a phase) and then transmitting each spatially precoded stream through multiple transmit antennas on the downlink. The spatially precoded data streams arrive at the UE(s) 306 with different spatial signatures, which enables each of the UE(s) 306 to recover the one or more data streams destined for that UE 306. On the uplink, each UE 306 transmits a spatially precoded data stream, which enables the eNB 304 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the downlink. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PAPR).

Figure 4:
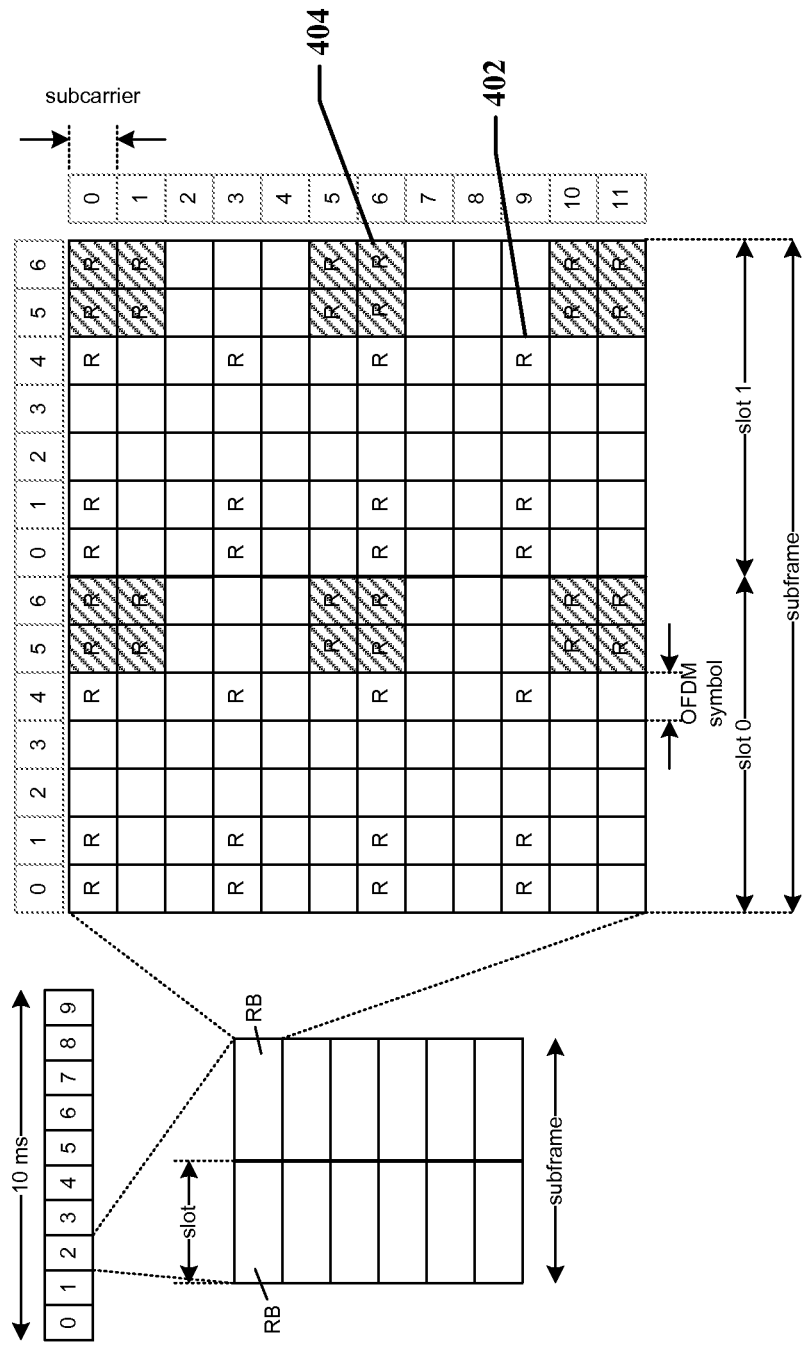
FIG. 4 is a diagram illustrating an example of a frame structure for use in an access network.

Various frame structures may be used to support the DL and UL transmissions. An example of a DL frame structure will now be presented with reference to FIG. 4. However, as those skilled in the art will readily appreciate, the frame structure for any particular application may be different depending on any number of factors. In this example, a frame (10 ms) is divided into 10 equally sized sub-frames. Each sub-frame includes two consecutive time slots.

A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. Some of the resource elements, as indicated as R 402, 404, include DL reference signals (DL-RS). The DL-RS include Cell-specific RS (CRS) (also sometimes called common RS) 402 and UE-specific RS (UE-RS) 404. UE-RS 404 are transmitted only on the resource blocks upon which the corresponding physical downlink shared channel (PDSCH) is mapped. The number of bits carried by each resource element depends on the modulation scheme. Thus, the more resource blocks that a UE receives and the higher the modulation scheme, the higher the data rate for the UE.

Figure 5:
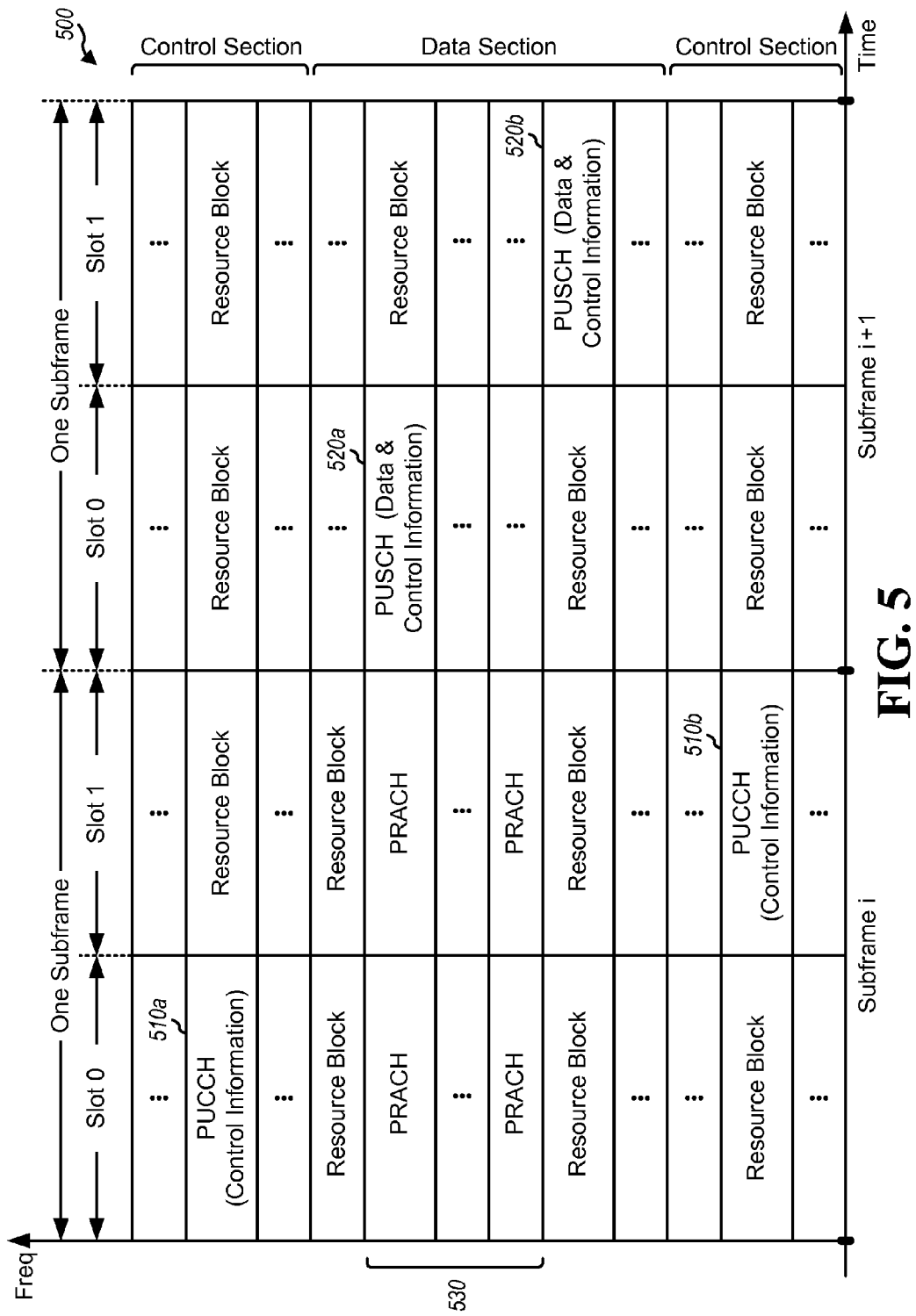
FIG. 5 shows an exemplary format for the UL in LTE.

An example of a UL frame structure 500 will now be presented with reference to FIG. 5. FIG. 5 shows an exemplary format for the UL in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 5 results in the data section including contiguous subcarriers, which may allow a single UE to be assigned all of the contiguous subcarriers in the data section.

A UE may be assigned resource blocks 510a, 510b in the control section to transmit control information to an eNB. The UE may also be assigned resource blocks 520a, 520b in the data section to transmit data to the eNB. The UE may transmit control information in a physical uplink control channel (PUCCH) on the assigned resource blocks in the control section. The UE may transmit only data or both data and control information in a physical uplink shared channel (PUSCH) on the assigned resource blocks in the data section. A UL transmission may span both slots of a subframe and may hop across frequency as shown in FIG. 5.

As shown in FIG. 5, a set of resource blocks may be used to perform initial system access and achieve UL synchronization in a physical random access channel (PRACH) 530. The PRACH 530 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 6:
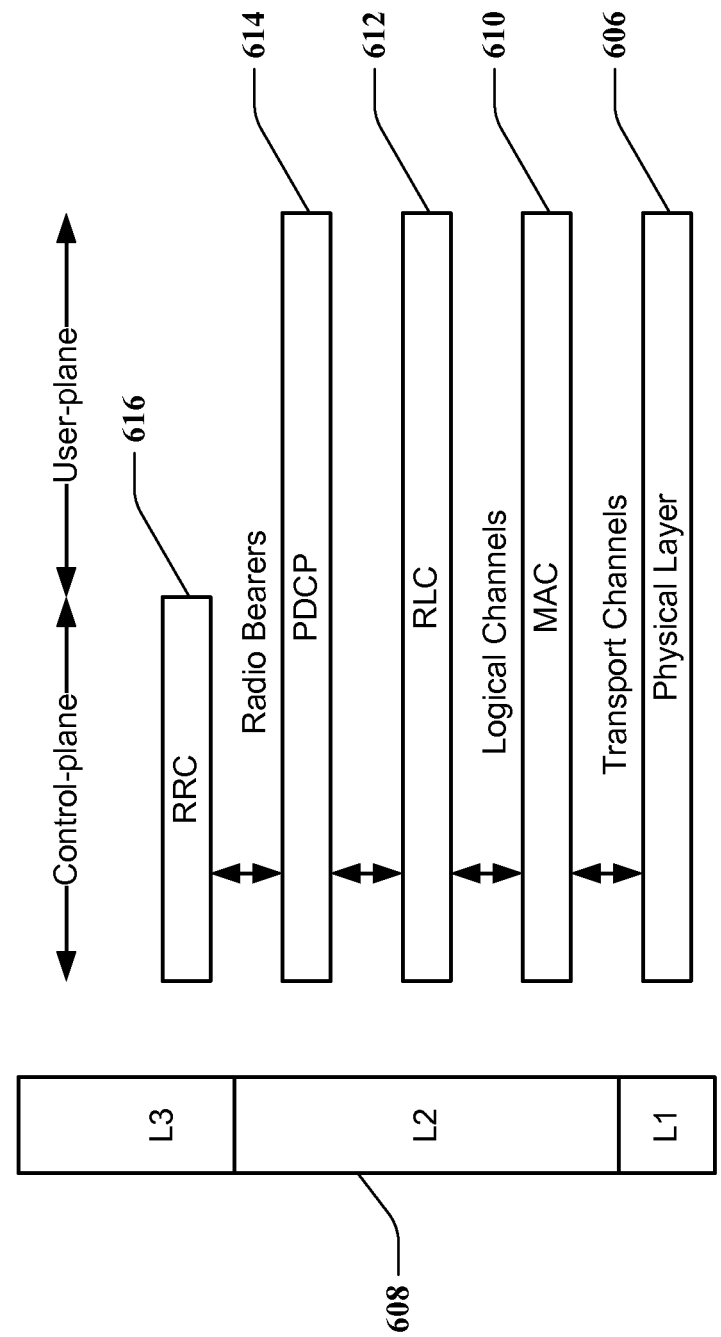
FIG. 6 is a diagram illustrating an example of a radio protocol architecture for the user and control plane.

The radio protocol architecture may take on various forms depending on the particular application. An example for an LTE system will now be presented with reference to FIG. 6. FIG. 6 is a conceptual diagram illustrating an example of the radio protocol architecture for the user and control planes.

Turning to FIG. 6, the radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 606. Layer 2 (L2 layer) 608 is above the physical layer 606 and is responsible for the link between the UE and eNB over the physical layer 606.

In the user plane, the L2 layer 608 includes a media access control (MAC) sublayer 610, a radio link control (RLC) sublayer 612, and a packet data convergence protocol (PDCP) 614 sublayer, which are terminated at the eNB on the network side. Although not shown, the UE may have several upper layers above the L2 layer 608 including a network layer (e.g., IP layer) that is terminated at the PDN gateway 208 (see FIG. 2) on the network side, and an application layer that is terminated at the other end of the connection (e.g., far end UE, server, etc.).

The PDCP sublayer 614 provides multiplexing between different radio bearers and logical channels. The PDCP sublayer 614 also provides header compression for upper layer data packets to reduce radio transmission overhead, security by ciphering the data packets, and handover support for UEs between eNBs. The RLC sublayer 612 provides segmentation and reassembly of upper layer data packets, retransmission of lost data packets, and reordering of data packets to compensate for out-of-order reception due to hybrid automatic repeat request (HARQ). The MAC sublayer 610 provides multiplexing between logical and transport channels. The MAC sublayer 610 is also responsible for allocating the various radio resources (e.g., resource blocks) in one cell among the UEs. The MAC sublayer 610 is also responsible for HARQ operations.

In the control plane, the radio protocol architecture for the UE and eNB is substantially the same for the physical layer 606 and the L2 layer 608 with the exception that there is no header compression function for the control plane. The control plane also includes a radio resource control (RRC) sublayer 616 in Layer 3 (L3 layer). The RRC sublayer 616 is responsible for obtaining radio resources (i.e., radio bearers) and for configuring the lower layers using RRC signaling between the eNB and the UE.

Figure 7:
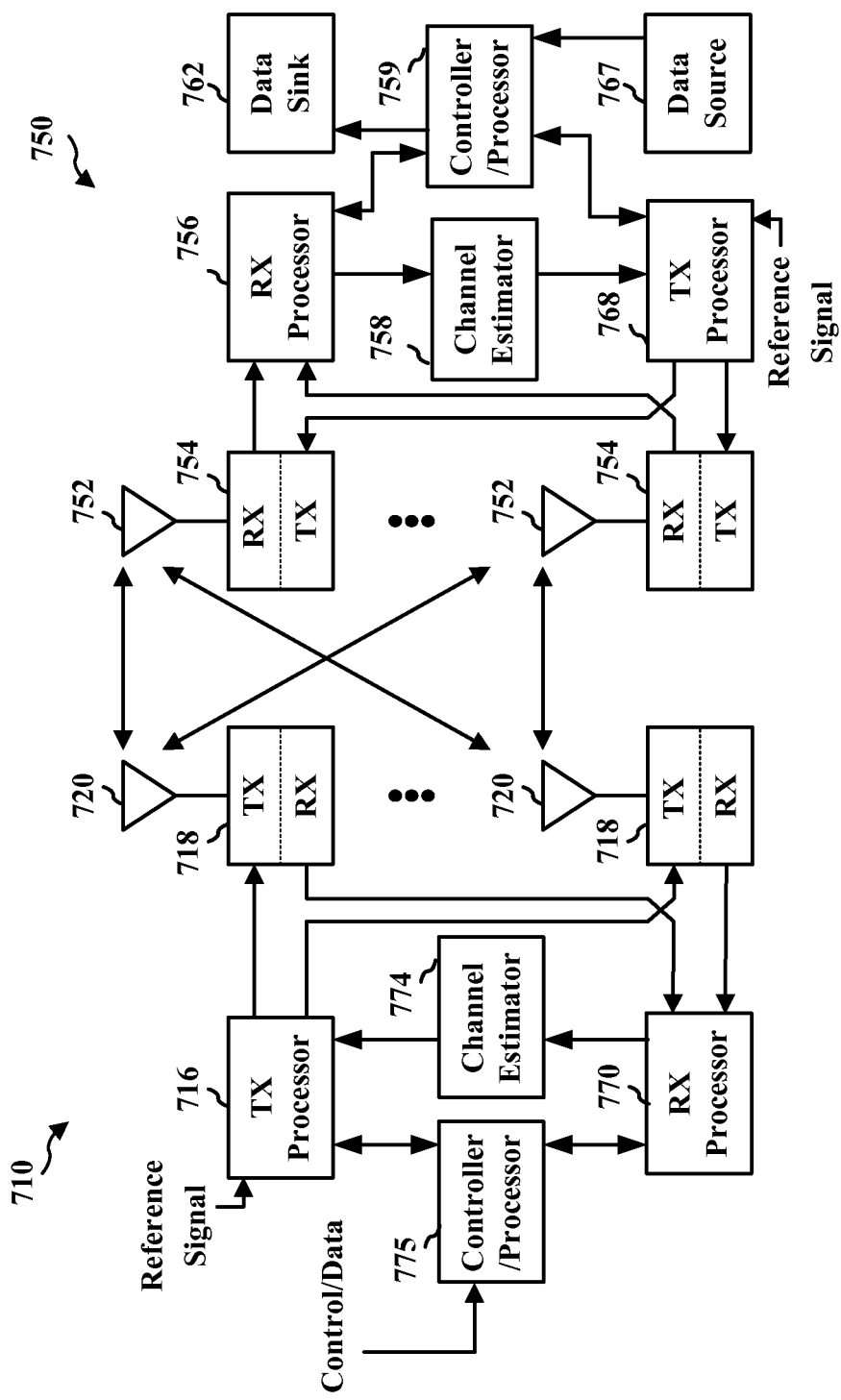
FIG. 7 is a diagram illustrating an example of an evolved Node B and user equipment in an access network.

FIG. 7 is a block diagram of an eNB 710 in communication with a UE 750 in an access network. In the DL, upper layer packets from the core network are provided to a controller/processor 775. The controller/processor 775 implements the functionality of the L2 layer described earlier in connection with FIG. 6. In the DL, the controller/processor 775 provides header compression, ciphering, packet segmentation and reordering, multiplexing between logical and transport channels, and radio resource allocations to the UE 750 based on various priority metrics. The controller/processor 775 is also responsible for HARQ operations, retransmission of lost packets, and signaling to the UE 750.

The TX processor 716 implements various signal processing functions for the L1 layer (i.e., physical layer). The signal processing functions includes coding and interleaving to facilitate forward error correction (FEC) at the UE 750 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 774 may be used to determine the coding and modulation scheme, as well as for spatial processing. The channel estimate may be derived from a reference signal and/or channel condition feedback transmitted by the UE 750. Each spatial stream is then provided to a different antenna 720 via a separate transmitter 718TX. Each transmitter 718TX modulates an RF carrier with a respective spatial stream for transmission.

At the UE 750, each receiver 754RX receives a signal through its respective antenna 752. Each receiver 754RX recovers information modulated onto an RF carrier and provides the information to the receiver (RX) processor 756.

The RX processor 756 implements various signal processing functions of the L1 layer. The RX processor 756 performs spatial processing on the information to recover any spatial streams destined for the UE 750. If multiple spatial streams are destined for the UE 750, they may be combined by the RX processor 756 into a single OFDM symbol stream. The RX processor 756 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 710. These soft decisions may be based on channel estimates computed by the channel estimator 758. The soft decisions are then decoded and deinterleaved to recover the data and control signals that were originally transmitted by the eNB 710 on the physical channel. The data and control signals are then provided to the controller/processor 759.

The controller/processor 759 implements the L2 layer described earlier in connection with FIG. 6. In the UL, the controller/processor 759 provides demultiplexing between transport and logical channels, packet reassembly, deciphering, header decompression, control signal processing to recover upper layer packets from the core network. The upper layer packets are then provided to a data sink 762, which represents all the protocol layers above the L2 layer. Various control signals may also be provided to the data sink 762 for L3 processing. The controller/processor 759 is also responsible for error detection using an acknowledgement (ACK) and/or negative acknowledgement (NACK) protocol to support HARQ operations.

In the UL, a data source 767 is used to provide upper layer packets to the controller/processor 759. The data source 767 represents all protocol layers above the L2 layer (L2). Similar to the functionality described in connection with the DL transmission by the eNB 710, the controller/processor 759 implements the L2 layer for the user plane and the control plane by providing header compression, ciphering, packet segmentation and reordering, and multiplexing between logical and transport channels based on radio resource allocations by the eNB 710. The controller/processor 759 is also responsible for HARQ operations, retransmission of lost packets, and signaling to the eNB 710.

Channel estimates derived by a channel estimator 758 from a reference signal or feedback transmitted by the eNB 710 may be used by the TX processor 768 to select the appropriate coding and modulation schemes, and to facilitate spatial processing. The spatial streams generated by the TX processor 768 are provided to different antenna 752 via separate transmitters 754TX. Each transmitter 754TX modulates an RF carrier with a respective spatial stream for transmission.

The UL transmission is processed at the eNB 710 in a manner similar to that described in connection with the receiver function at the UE 750. Each receiver 718RX receives a signal through its respective antenna 720. Each receiver 718RX recovers information modulated onto an RF carrier and provides the information to a RX processor 770. The RX processor 770 may implement the L1 layer.

The controller/processor 775 implements the L2 layer described earlier in connection with FIG. 6. In the UL, the control/processor 775 provides demultiplexing between transport and logical channels, packet reassembly, deciphering, header decompression, control signal processing to recover upper layer packets from the UE 750. Upper layer packets from the controller/processor 775 may be provided to the core network. The controller/processor 775 is also responsible for error detection using an ACK and/or NACK protocol to support HARQ operations. The processing system 114 described in relation to FIG. 1 includes the UE 750. In particular, the processing system 114 includes the TX processor 768, the RX processor 756, and the controller/processor 759.

A wireless communication network may support broadcast, multicast, and unicast services. A unicast service is a service intended for a specific user, e.g., a voice call. A broadcast service is a service that may be received by all users, e.g., a news broadcast. A multicast service is a service that may be received by a group of users, e.g., a subscription video service. Broadcast services and multicast services may be provided during multi-media broadcast over a single frequency network (MBSFN) subframes. The evolved MBMS (eM-BMS) feature is provided with the MBSFN mode of operation and can simultaneously transmit the same media signals using UMTS LTE eNBs to multiple recipients in the same geographic region. Examples of location-based services are location-specific advertisements or traffic alerts. By the nature of broadcast operation, as well as for efficient service provisioning, distribution of these services may occur over a large geographic area, for example broadcast by one or more transmitter sites covering a portion of, or an entire metropolitan area. Location specific contents are often relevant only to users located in a specific, typically much smaller, area relative to the broadcast reception area. For example, a location-based ad or coupon may be targeted to end users situated nearby a particular store running a time-limited sale or promotion. Further, traffic alerts are generally most relevant for motorists likely to be affected by the incident—for example heading to or located nearby the section of highway where the jam occurs. With respect to the unicast and multicast/broadcast services, a UE may maintain a time tracking loop (TTL) for updating a DL timing and a frequency tracking loop (FTL) for updating a sampling frequency with respect to a carrier frequency for receiving signals associated with those services.

The TTL and the FTL are important factors in receiver performance. The TTL allows for a correct starting point of the FFT window such that inter-symbol interference is minimized. The FTL allows for a correct sampling frequency such that inter-carrier interference is minimized. The timing offset determined in the TTL and the frequency offset determined in the FTL can be further used for channel estimation in a current subframe and are used to update the DL timing (i.e., starting point of the FFT window) and the sampling frequency for the next subframe. The TTL and the FTL may be different depending on whether the signal is coming from a single cell or multiple cells. For unicast signals, data may be sent from a serving cell while other cells inject interference or data may be sent from a few coordinating cells while non-coordinating cells inject interference. When data are sent from only the serving cell, the TTL and the FTL may track the timing offset and the frequency offset, respectively, of the serving cell by capturing useful signals from the serving cell. When data are sent from a few coordinating cells (e.g., in coordinated multipoint transmission and reception (CoMP) where control is coming from a single cell while data are jointly transmitted from multiple cells), the TTL and the FTL may be based on signals from the coordinating cells. For multicast/broadcast signals, useful signals can come from one or multiple cells. The TTL may try to capture all useful signals from all MBSFN cells. The FTL may need to track a composite frequency offset relative to a plurality of MBSFN signals from multiple cells, rather than one MBSFN signal from an individual cell. Each MBSFN area generally has a different group of cells transmitting an MBSFN signal. For example, signals from MBSFN area A may be sent from different cells than signals from MBSFN area B. As such, the timing offset and frequency offset may be different for MBSFN area A and MBSFN area B.

When the UE uses the same TTL and FTL for both unicast and multicast/broadcast signals, where the UE updates the TTL and FTL based on both the unicast and multicast/broadcast signals, the UE will use the DL timing and the sampling frequency updated as a result of the tracking loops for receiving both the unicast and multicast/broadcast signals. Using the DL timing and the sampling frequency updated as a result of both the unicast and multicast/broadcast signals may not guarantee the best timing and frequency information for the unicast and multicast/broadcast signals. In this case, the physical multicast channel (PMCH) symbols may rely on extended CP to capture signals from other cells. Further, the FFT window position may not be the best for MBSFN signals. Even if MBSFN cells are perfectly synchronized at the transmitter, signals that arrive at the UE may have different delay due to different propagation distances. Accordingly, the unicast and multicast/broadcast timing may not be able to capture useful signals for MBSFN. Furthermore, the FTL is not guaranteed to track the frequency from the composite signal from multiple cells. This is especially true when there is an inter-eNB frequency offset. The current eNB frequency requirement is as follows:

| BS Class | Accuracy | |
| --- | --- | --- |
| Wide Area BS | ±0.05 ppm | ±100 Hz with 2 GHz Band |
| Local Area BS | ±0.1 ppm | ±200 Hz with 2 GHz Band |

A UE may experience PMCH performance loss when the tracking loops, which are maintained based on both unicast and multicast/broadcast signals, are used for decoding both unicast and broadcast/multicast signals.

In an exemplary method, a UE may maintain a first set of tracking loops associated with unicast signals and a second set of tracking loops associated with multicast/broadcast signals (e.g., evolved multimedia broadcast and multimedia services (eMBMS)). The UE may decode at least one of a received unicast signal based on the first set of tracking loops or a received multicast/broadcast signal based on the second set of tracking loops.

In an exemplary configuration for a UE receiver, a UE may maintain a tracking loop per carrier for unicast signals and a tracking loop per carrier for multicast/broadcast signals. In addition, the UE may maintain a tracking loop per MBSFN area for each carrier on which the UE is receiving multicast/broadcast signals. Specifically, the UE may maintain a unicast tracking loop for each activated carrier. The tracking loops may be based on CRS, channel state information reference signals (CSI-RS), or UE-RS. Furthermore, data and control may be decoupled such that different tracking loops are maintained for unicast data and unicast control. In such a configuration, unicast control tracking loops may be based on CRS or CSI-RS while unicast data tracking loops may be based on UE-RS. The UE may also maintain a multicast/broadcast tracking loop per MBSFN area for each carrier from which the UE receives a multicast/broadcast service. In such a configuration, the tracking loops may be based on multicast/broadcast RS sent on antenna port 4.

In one configuration of the UE receiver, there may be different timing offsets (i.e., FFT window positions) and frequency offsets for unicast control, unicast data, and MBSFN symbols. Control symbols may always follow the unicast control tracking loop. Such control symbols include those control symbols in both non-MBSFN subframes and MBSFN subframes. Control symbols that are received in both MBSFN subframes and non-MBSFN subframes are unicast control information. Unicast data (carried on the PDSCH) symbols in transmission mode 7/8/9 may follow the unicast data tracking loop. Transmission mode 7/8/9 is based on UE-RS, so it is possible that data in such transmission mode are sent from multiple cells. Explicit signaling from the eNB may tell the UE which cells are transmitting unicast data. Depending on the participating cells, the UE can use a unicast control loop or use a separate loop for data. For example, if two or more cells are transmitting unicast data, the UE may use a separate loop for the unicast data (e.g., based on UE-RS) than is used for the unicast control information (which is transmitted from the serving cell). The multicast/broadcast data (carried in the PMCH) symbols within MBSFN subframes may follow the multicast/broadcast tracking loop. PMCH symbols from different MBSFN areas may follow different multicast/broadcast tracking loops. The UE may determine which PMCH subframes belong to which MBSFN area from system information block 13 (SIB13) and the multicast control channel (MCCH).

Alternatively, in a simplified configuration, two separate sets of loops may be provided. The two separate sets of loops may include a unicast TTL and a unicast FTL for unicast signals and a multicast/broadcast TTL and a multicast/broadcast FTL for multicast/broadcast signals where different MBSFN areas use the same TTL and FTL. The simplified configuration may result in more inter-symbol and inter-carrier interference if one MBSFN area includes one cell while another MBSFN area includes multiple cells. Different MBSFN areas may have different cells participating in MBSFN transmission, and hence potentially different timing offsets and frequency offsets. The UE may not be aware of how many cells participate in an MBSFN transmission. Similarly, the UE may not be aware of which cells are in which MBSFN areas. In this simplified configuration, there may be PMCH performance loss.

Even when multi-tracking loops are employed by the UE, the UE generally needs to do CRS/CSI-RS/UE-RS processing for unicast signals for timing and frequency offset estimation. Filtering of timing and frequency offsets (e.g., smoothing, averaging, and the like) may need to be limited to unicast subframes. The UE may need to do PMCH RS processing for PMCH decoding. Timing and frequency offset estimation based on PMCH RS can be done similarly. Such operation may be needed with the receiver and the simplified configuration. Filtering of timing and frequency offsets may need to be limited to multicast/broadcast subframes per MBSFN area. Additional operation with multiple MBSFN areas may limit such filtering to appropriate multicast/broadcast subframes for each MBSFN area. Because the UE needs to do RS processing for demodulation, the functionality for providing parallel tracking loops may not add much complexity.

Figure 8:
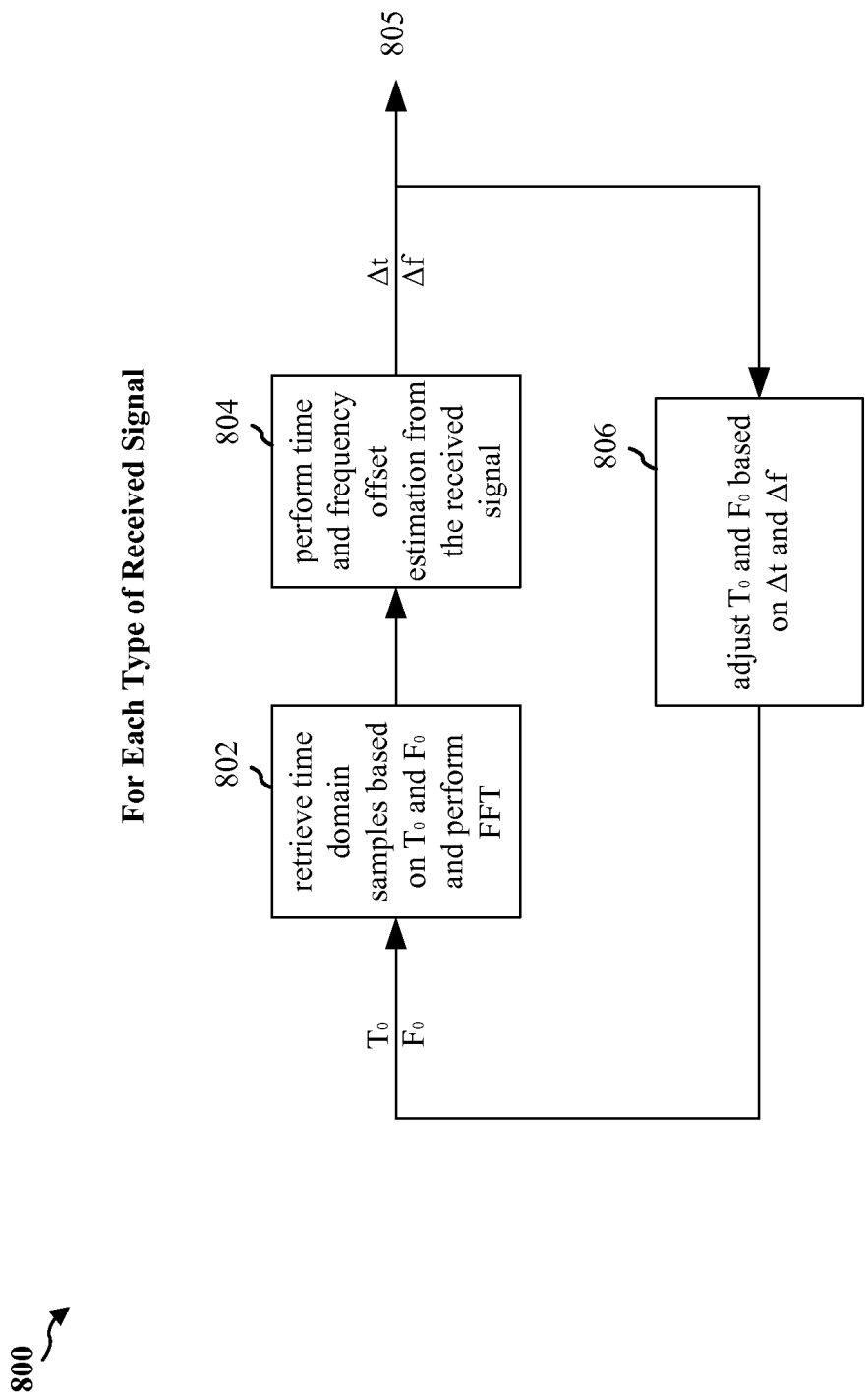
FIG. 8 is a flow chart illustrating a time tracking loop and a frequency tracking loop for each type of received signal.

FIG. 8 is a flow chart 800 illustrating a TTL and an FTL for each type of received signal. As discussed supra, in an exemplary method, a UE may maintain a first set of tracking loops associated with unicast signals and a second set of tracking loops associated with multicast/broadcast signals. The UE maintains the first set of tracking loops by performing the steps 802, 804, 806 for unicast signals and the second set of tracking loops by performing the steps 802, 804, 806 for multicast/broadcast signals. For example, the first set of tracking loops may include a first TTL and a first FTL for one or more types of unicast signals and a second TTL and a second FTL for one or more types of multicast/broadcast signals. The UE determines an initial unicast DL timing $T_0$ and an initial unicast sampling frequency $F_0$ based on received primary synchronization signals (PSS) and/or secondary synchronization signals (SSS). In the first TTL and the first FTL, the UE retrieves unicast time domain samples based on a unicast DL timing $T_0$ and a unicast sampling frequency $F_0$ and decodes the retrieved samples (802). The UE estimates a timing offset $\Delta t$ and a frequency offset $\Delta f$ from the decoded retrieved samples (804). The UE conducts channel estimation (805) on the received signal based on the estimated timing offset $\Delta t$ and the frequency offset $\Delta f$. In the first TTL, the UE adjusts the unicast DL timing $T_0$ based on the timing offset $\Delta t$ (806). In the first FTL, the UE adjusts the unicast sampling frequency $F_0$ based on the frequency offset $\Delta f$ (806).

In the second TTL and the second FTL, the UE retrieves multicast/broadcast time domain samples based on a multicast/broadcast DL timing $T_0$ and a multicast/broadcast sampling frequency $F_0$ and decodes the retrieved samples (802). The UE estimates a timing offset $\Delta t$ and a frequency offset $\Delta f$ from the decoded retrieved samples (804). The UE conducts channel estimation on the received signal based on the estimated timing offset $\Delta t$ and the frequency offset $\Delta f$. In the second TTL, the UE adjusts the multicast/broadcast DL timing $T_0$ based on the timing offset $\Delta t$ (806). In the second FTL, the UE adjusts the multicast sampling frequency $F_0$ based on the frequency offset $\Delta f$ (806). The adjusted DL timing $T_0$ and the adjusted sampling frequency $F_0$ are used for future subframes, while the estimated timing offset $\Delta t$ and the frequency offset $\Delta f$ are used in a current subframe for channel estimation.

Figure 9:
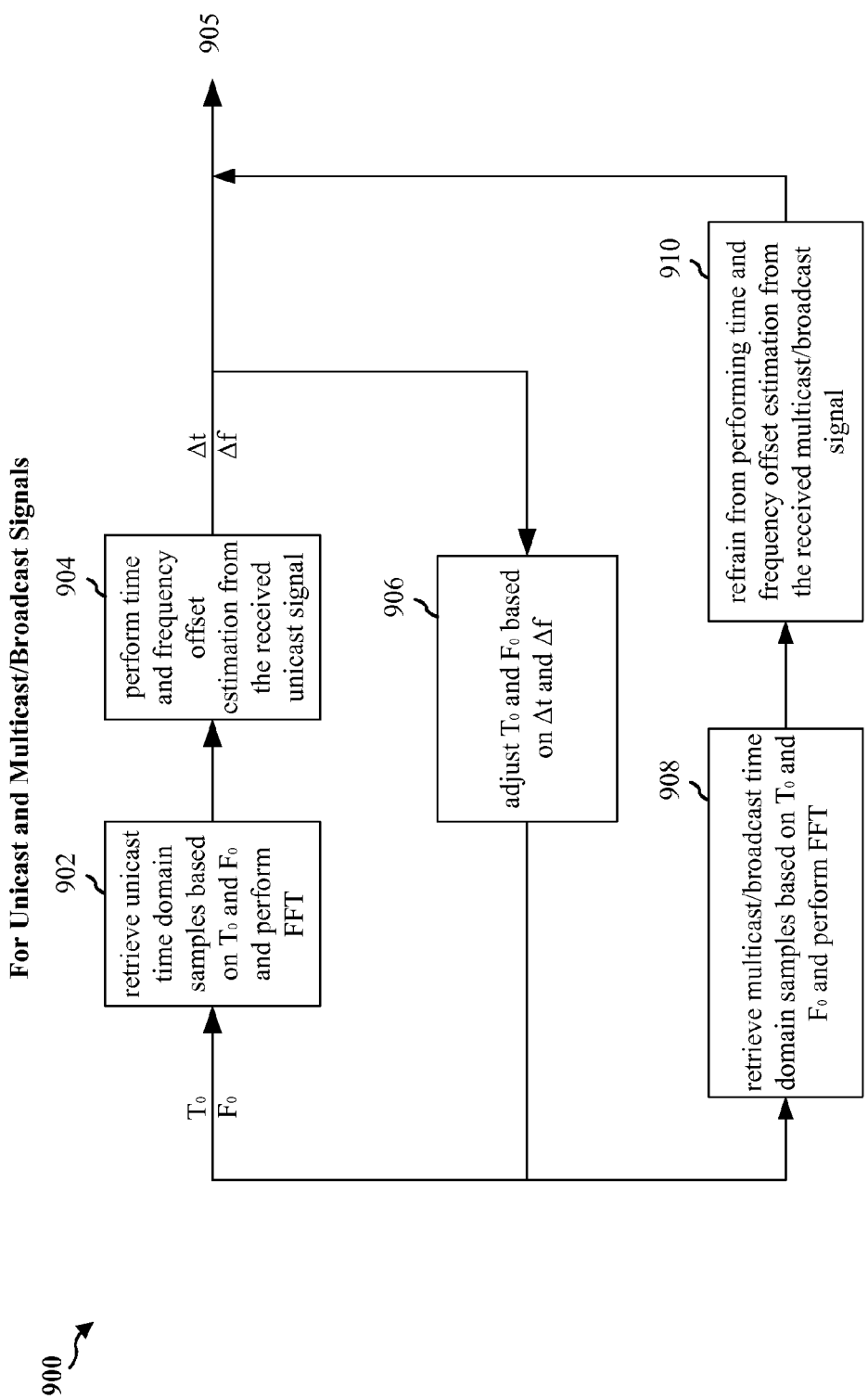
FIG. 9 is a first flow chart illustrating one time tracking loop and one frequency tracking loop for a plurality of types of received signals.

FIG. 9 is a first flow chart 900 illustrating one TTL and one FTL for a plurality of types of received signals. In another exemplary method, a UE maintains a TTL and an FTL associated with unicast signals based only on received unicast signals. In addition, the UE receives a multicast/broadcast signal and decodes the received multicast/broadcast signal based on the TTL and the FTL maintained based only on the received unicast signals. Further, the UE refrains from performing time and frequency offset estimation based on the received multicast/broadcast signal. Accordingly, a UE updates a TTL and an FTL based only on received unicast signals and uses the TTL and FTL for decoding both unicast and multicast/broadcast signals, but does not determine time and frequency offsets based on a received multicast/broadcast signal. Referring to FIG. 9, the UE determines an initial unicast DL timing $T_0$ and an initial unicast sampling frequency $F_0$ based on received PSS and/or SSS. In the TTL and the FTL, the UE retrieves unicast time domain samples based on a unicast DL timing $T_0$ and a unicast sampling frequency $F_0$ and decodes the retrieved samples (902). The UE estimates a unicast timing offset $\Delta t$ and a unicast frequency offset $\Delta f$ from the decoded retrieved samples (904). The UE conducts channel estimation (905) on the received signal based on the estimated unicast timing offset $\Delta t$ and the unicast frequency offset $\Delta f$. In the TTL, the UE adjusts the unicast DL timing $T_0$ based on the unicast timing offset $\Delta t$ (906). In the FTL, the UE adjusts the unicast sampling frequency $F_0$ based on the unicast frequency offset $\Delta f$ (906). The adjusted DL timing $T_0$ and the adjusted sampling frequency $F_0$ are used for future subframes, while the estimated unicast timing offset $\Delta t$ and the estimated frequency offset $\Delta f$ are used in a current subframe for channel estimation.

When the UE receives a multicast/broadcast signal, the UE retrieves multicast/broadcast time domain samples based on the unicast DL timing $T_0$ and the unicast sampling frequency $F_0$ and decodes the retrieved samples (908). The UE refrains from performing time and frequency offset estimation based on the received multicast/broadcast signal (910), and therefore does not estimate a multicast/broadcast timing offset $\Delta t$ or a multicast/broadcast frequency offset $\Delta f$ for the received multicast/broadcast signal. As such, the UE conducts channel estimation (905) on the received multicast/broadcast signal assuming the multicast/broadcast timing offset $\Delta t$ and the multicast/broadcast frequency offset $\Delta f$ are fixed (e.g., zero) unless there are a previously estimated unicast timing offset $\Delta t$ and frequency offset $\Delta f$. If there are a previously estimated unicast timing offset $\Delta t$ and unicast frequency offset $\Delta f$, the UE conducts channel estimation (905) on the received multicast/broadcast signal based on the previously estimated unicast timing offset $\Delta t$ and the unicast frequency offset $\Delta f$. Because the UE does not estimate a multicast/broadcast timing offset $\Delta t$ and a multicast/broadcast frequency offset $\Delta f$, the UE does not update the unicast TTL or the unicast FTL based on the received multicast/broadcast signal. Some performance loss is encountered during channel estimation of a received multicast/broadcast signal due to the use of a previously estimated unicast timing offset $\Delta t$ and unicast frequency offset $\Delta f$.

Figure 10:
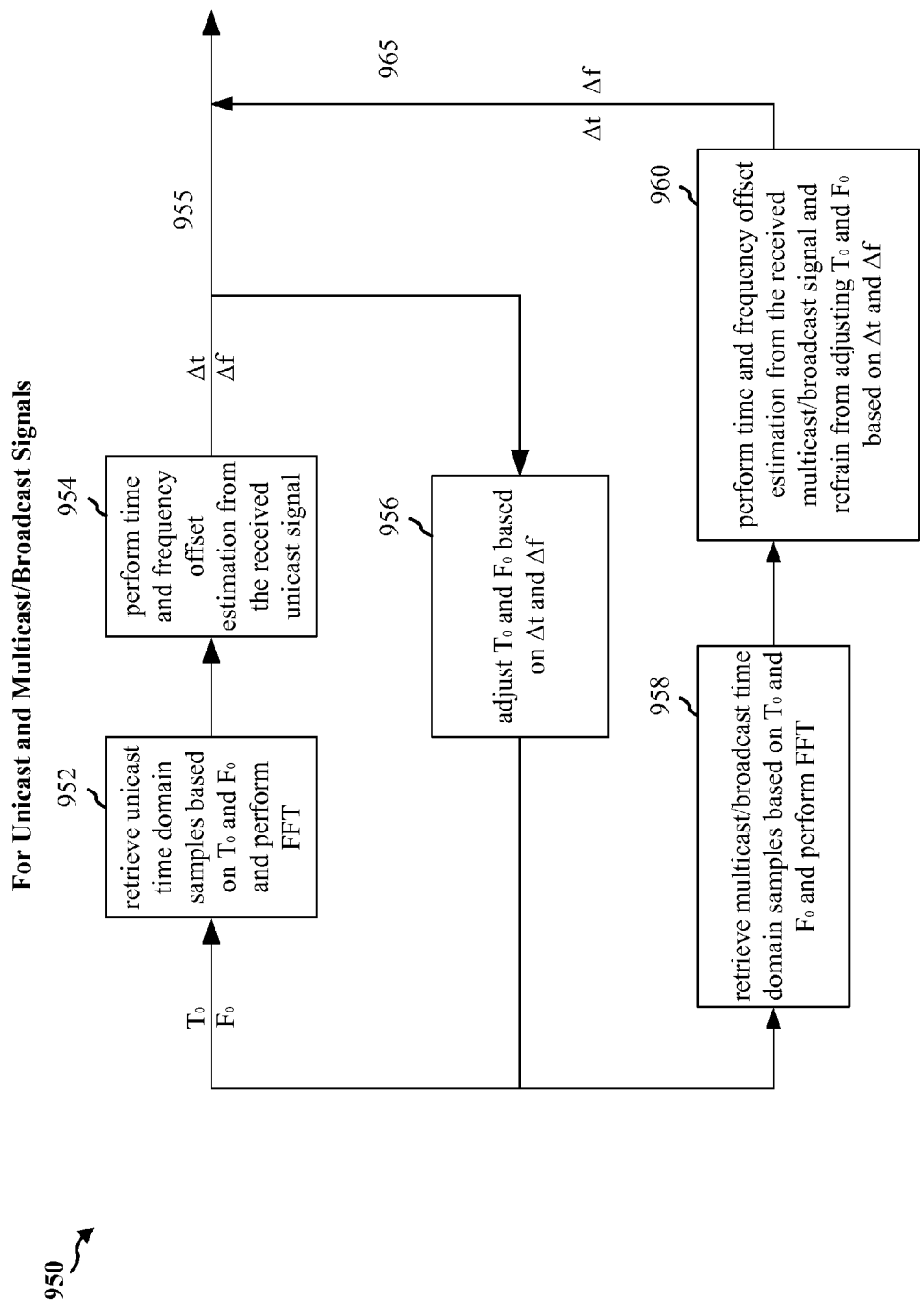
FIG. 10 is a second flow chart illustrating one time tracking loop and one frequency tracking loop for a plurality of types of received signals.

FIG. 10 is a second flow chart 950 illustrating one TTL and one FTL for a plurality of types of received signals. In another exemplary method, a UE maintains a TTL and an FTL associated with unicast signals based only on received unicast signals. In addition, the UE receives a multicast/broadcast signal and decodes the received multicast/broadcast signal based on the TTL and the FTL maintained based only on the received unicast signals. Further, while the UE performs time and frequency offset estimation based on the received multicast/unicast signal, the UE refrains from updating the TTL and the FTL based on the estimated time and frequency offsets. Accordingly, a UE updates a TTL and an FTL based only on received unicast signals, uses the TTL and FTL for decoding both unicast and multicast/broadcast signals, and performs time and frequency offset estimation based on a received multicast/broadcast signal, but does not update the FTL and the TTL based on the estimated time and frequency offsets. Referring to FIG. 10, the UE determines an initial unicast DL timing $T_0$ and an initial unicast sampling frequency $F_0$ based on received PSS and/or SSS. In the TTL and the FTL, the UE retrieves unicast time domain samples based on a unicast DL timing $T_0$ and a unicast sampling frequency $F_0$ and decodes the retrieved samples (952). The UE estimates a unicast timing offset $\Delta t$ and a unicast frequency offset $\Delta f$ from the decoded retrieved samples (954). The UE conducts channel estimation (955) on the received signal based on the estimated unicast timing offset $\Delta t$ and the unicast frequency offset $\Delta f$. In the TTL, the UE adjusts the unicast DL timing $T_0$ based on the unicast timing offset $\Delta t$ (956). In the FTL, the UE adjusts the unicast sampling frequency $F_0$ based on the unicast frequency offset $\Delta f$ (956). The adjusted DL timing $T_0$ and the adjusted sampling frequency $F_0$ are used for future subframes, while the estimated unicast timing offset $\Delta t$ and the estimated frequency offset $\Delta f$ are used in a current subframe for channel estimation.

When the UE receives a multicast/broadcast signal, the UE retrieves multicast/broadcast time domain samples based on the unicast DL timing $T_0$ and the unicast sampling frequency $F_0$ and decodes the retrieved samples (958). The UE performs time and frequency offset estimation based on the received multicast/broadcast signal (960), but refrains from adjusting the unicast DL timing $T_0$ and the unicast sampling frequency $F_0$ based on the estimated multicast/broadcast time offset $\Delta t$ and the multicast/broadcast frequency offset $\Delta f$ (960). Accordingly, the UE conducts channel estimation (965) on the received multicast/broadcast signal based on the estimated multicast/broadcast time offset $\Delta t$ and the multicast/broadcast frequency offset $\Delta f$, and therefore avoids the performance loss mentioned supra with respect to FIG. 9. However, the UE does not update the unicast TTL or the unicast FTL based on the estimated multicast/broadcast time and frequency offsets.

Figure 11:
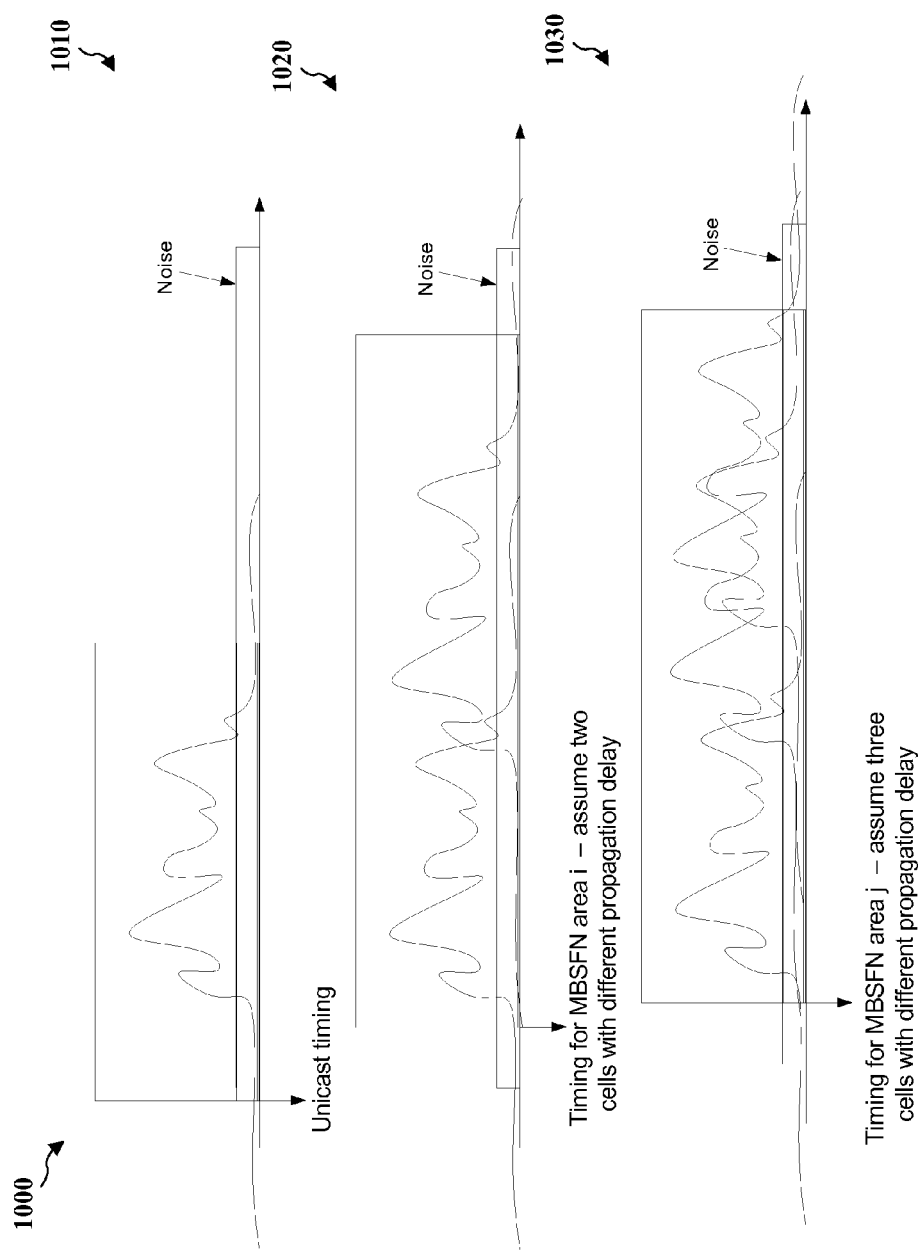
FIG. 11 is a diagram illustrating different DL timing as a result of the plurality of time tracking loops for unicast signals and multicast/broadcast signals from each multi-media broadcast over a single frequency network area.

FIG. 11 is a diagram 1000 illustrating different DL timing as a result of the plurality of TTLs for unicast signals and multicast/broadcast signals from each MBSFN area. As shown in FIG. 11, the DL timing for unicast signals 1010, the DL timing for multicast/broadcast signals from MBSFN area i 1020, and the DL timing for multicast/broadcast signals from MBSFN area j 1030 are different, each with different starting points. The different starting points are a result of parallel TTLs, each of which allow for its respective DL timing $T_0$ to be updated based on the corresponding signals. By properly choosing the DL timing starting points, the unicast and multicast/broadcast signals may be captured without capturing too much noise.

Figure 12:
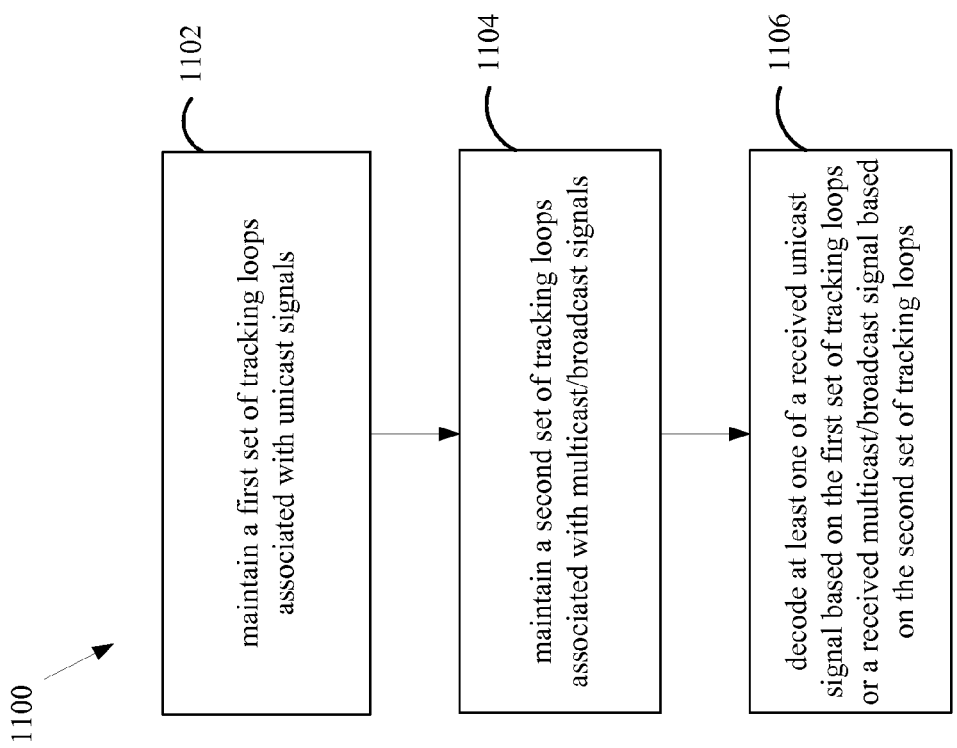
FIG. 12 is a flow chart of a first method of wireless communication.

FIG. 12 is a flow chart 1100 of a method of wireless communication. The method may be performed by a UE. As shown in FIG. 12, the UE maintains a first set of tracking loops associated with unicast signals (1102). In addition, the UE maintains a second set of tracking loops associated with multicast/broadcast signals (1104). Furthermore, the UE decodes at least one of a received unicast signal based on the first set of tracking loops or a received multicast/broadcast signal based on the second set of tracking loops (1106). For example, the UE may decode a received unicast signal based on a DL timing $T_0$ and a unicast sampling frequency $F_0$ determined in the first set of tracking loops and/or the UE may decode a received multicast/broadcast signal based on a DL timing $T_0$ and a multicast/broadcast sampling frequency $F_0$ determined in the second set of tracking loops.

In one configuration, the first set of tracking loops include a TTL and an FTL for each carrier on which the unicast signals are received. In one configuration, the second set of tracking loops include a TTL and an FTL for each carrier on which the multicast/broadcast signals are received. In one configuration, the received multicast/broadcast signal is received from a plurality of MBSFN areas, and the second set of tracking loops include a TTL and an FTL for each of the MBSFN areas. In such a configuration, the UE may maintain the TTL and the FTL for each MBSFN area based on MBSFN reference signals within the multicast/broadcast signals from the MBSFN area.

In one configuration, the first set of tracking loops are maintained based on the unicast signals received from a set of cells, and the first set of tracking loops includes at least one TTL for tracking a timing offset of unicast signals received from at least one cell with respect to a DL timing, and at least one FTL for tracking a frequency offset of unicast signals received from at least one cell with respect to a carrier frequency on which the unicast signals are received. In such a configuration, when the at least one cell includes a plurality of cells, the timing offset is a composite timing offset of the unicast signals received from each cell in the plurality of cells and the frequency offset is a composite frequency offset of the unicast signals received from each cell in the plurality of cells. The composite offset may be based on an average of multiple offsets, some combination of the multiple offsets, an estimation of a composite signal, or some other means of determining the composite offset.

In one configuration, the second set of tracking loops are maintained based on the multicast/broadcast signals received from at least one cell, and the second set of tracking loops includes at least one TTL for tracking a timing offset of multicast/broadcast signals received from the at least one cell with respect to a DL timing, and at least one FTL for tracking a frequency offset of multicast/broadcast signals received from the at least one cell with respect to a carrier frequency on which the multicast/broadcast signals are received. In such a configuration, when the at least one cell includes a plurality of cells, the timing offset is a composite timing offset of the multicast/broadcast signals received from each cell in the plurality of cells and the frequency offset is a composite frequency offset of the multicast/broadcast signals received from each cell in the plurality of cells. The composite offset may be based on an average of multiple offsets, some combination of the multiple offsets, an estimation of a composite signal, or some other means of determining the composite offset.

Figure 13:
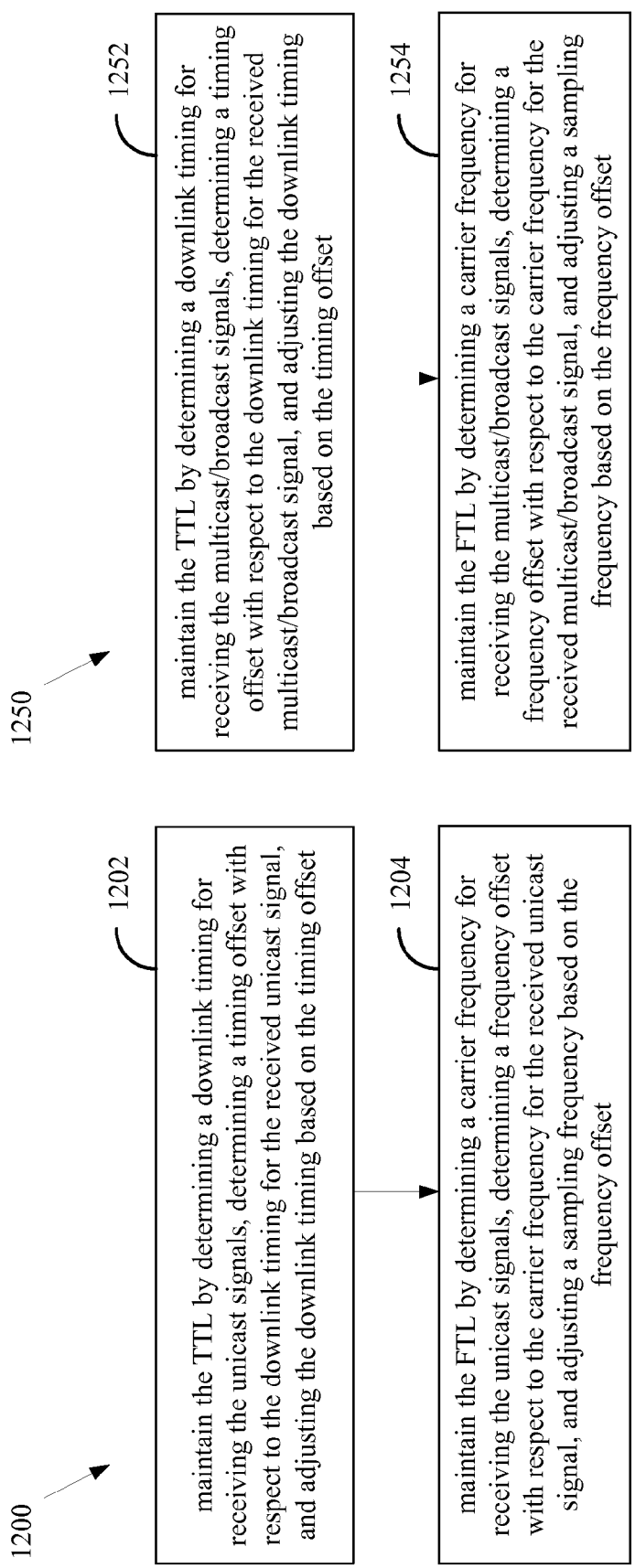
FIG. 13 shows flow charts of additional methods of wireless communication.

FIG. 13 shows flow charts 1200, 1250 of additional methods of wireless communication. In one configuration, the first set of tracking loops includes a TTL and an FTL. In such a configuration, the UE maintains the TTL by determining a DL timing for receiving the unicast signals, determining a timing offset with respect to the DL timing for the received unicast signal, and adjusting the DL timing based on the timing offset (1202). Furthermore, in such a configuration, the UE maintains the FTL by determining a carrier frequency for receiving the unicast signals, determining a frequency offset with respect to the carrier frequency for the received unicast signal, and adjusting a sampling frequency based on the frequency offset (1204). In one configuration, the timing offset and the frequency offset are determined based on at least one of CRS, CSI-RS, or UE-RS within the received unicast signal.

In one configuration, the second set of tracking loops includes a TTL and an FTL. In such a configuration, the UE maintains the TTL by determining a DL timing for receiving the multicast/broadcast signals, determining a timing offset with respect to the DL timing for the received multicast/broadcast signal, and adjusting the DL timing based on the timing offset (1252). Furthermore, in such a configuration, the UE maintains the FTL by determining a carrier frequency for receiving the multicast/broadcast signals, determining a frequency offset with respect to the carrier frequency for the received multicast/broadcast signal, and adjusting a sampling frequency based on the frequency offset (1254). In one configuration, the timing offset and the frequency offset are determined based on MBSFN reference signals within the received multicast/broadcast signal. In one configuration, the received multicast/broadcast signal is received from a plurality of MBSFN areas, the timing offset is a composite timing offset of the received multicast/broadcast signal from each of the MBSFN areas, and the frequency offset is a composite frequency offset of the received multicast/broadcast signal from each of the MBSFN areas.

Figure 14:
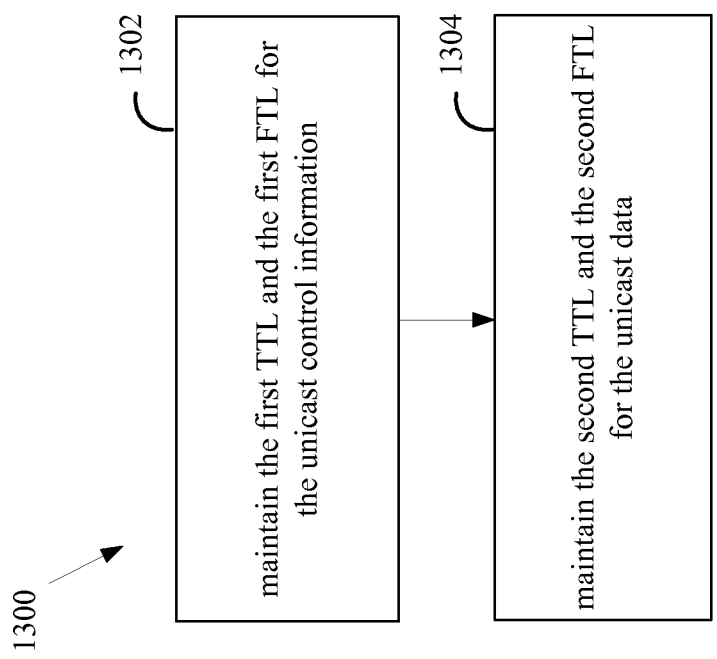
FIG. 14 is a flow chart of another method of wireless communication.

FIG. 14 is a flow chart 1300 of another method of wireless communication. In one configuration, the unicast signals include unicast control information and unicast data, and the first set of tracking loops includes a TTL and an FTL. In such a configuration, the UE maintains the TTL and the FTL for both the unicast control information and the unicast data. The unicast control information may be received in both MBSFN subframes and non-MBSFN subframes. The UE may maintain the TTL and the FTL based on at least one of CRS, CSI-RS, or UE-RS within the unicast signals. Alternatively, in one configuration, the unicast signals include unicast control information and unicast data, and the first set of tracking loops includes a first TTL, a first FTL, a second TTL, and a second FTL. As shown in FIG. 14, in such a configuration, the UE maintains the first TTL and the first FTL for the unicast control information (1302), and maintains the second TTL and the second FTL for the unicast data (1304). In one configuration, the first TTL and the first FTL are maintained based on at least one of CRS or CSI-RS within the unicast control information, and the second TTL and the second FTL are maintained based on UE-RS within the unicast data.

Figure 15:
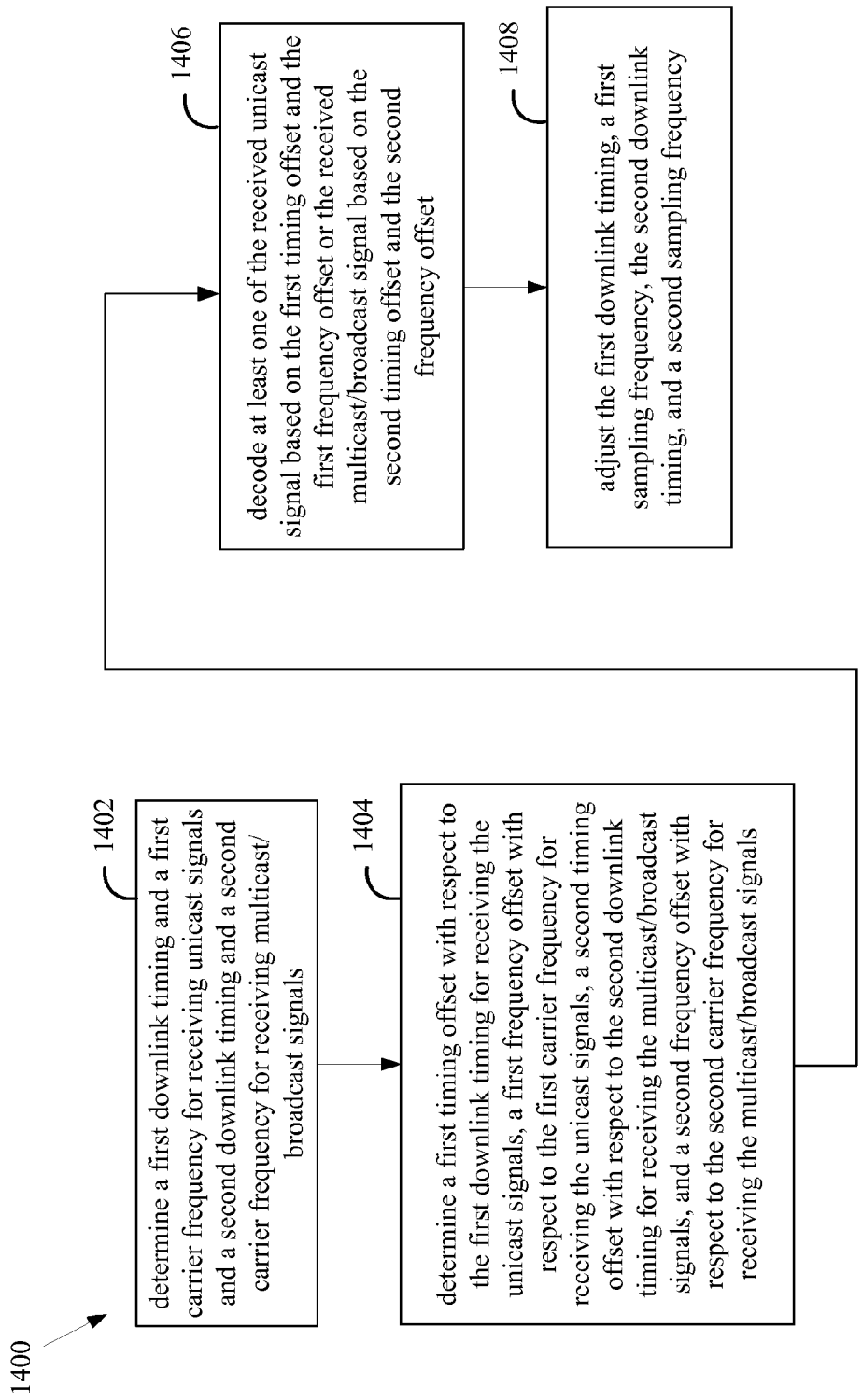
FIG. 15 is a flow chart of a method of wireless communication in which a first time tracking loop and a first frequency tracking loop are maintained for unicast signals and a second time tracking loop and a second frequency tracking loop are maintained for multicast/broadcast signals.

FIG. 15 is a flow chart 1400 of a method of wireless communication in which a first TTL and a first FTL are maintained for unicast signals and a second TTL and a second FTL are maintained for multicast/broadcast signals. The method may be performed by a UE. In one configuration, the first set of tracking loops includes a first TTL and a first FTL, and the second set of tracking loops includes a second TTL and a second FTL. In such a configuration, the UE determines a first DL timing and a first carrier frequency for receiving unicast signals and a second DL timing and a second carrier frequency for receiving multicast/broadcast signals (1402). In addition, the UE determines a first timing offset with respect to the first DL timing for receiving the unicast signals, a first frequency offset with respect to the first carrier frequency for receiving the unicast signals, a second timing offset with respect to the second DL timing for receiving the multicast/broadcast signals, and a second frequency offset with respect to the second carrier frequency for receiving the multicast/broadcast signals (1404). In addition, the UE decodes at least one of the received unicast signal based on the first timing offset and the first frequency offset or the received multicast/broadcast signal based on the second timing offset and the second frequency offset (1406). Furthermore, the UE adjusts the first DL timing, a first sampling frequency, the second DL timing, and a second sampling frequency by adjusting the first DL timing within the first TTL, adjusting the first sampling frequency within the first FTL, adjusting the second DL timing within the second TTL, and adjusting the second sampling frequency within the second FTL (1408).

Figure 16:
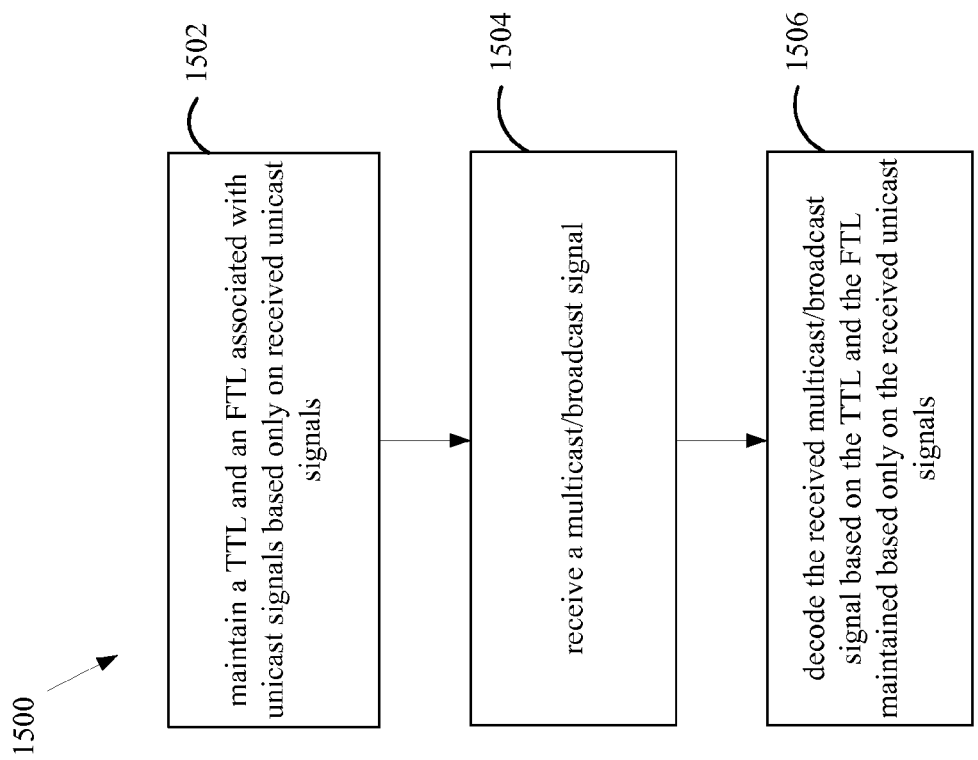
FIG. 16 is a flow chart of a second method of wireless communication.

FIG. 16 is a flow chart 1500 of a second method of wireless communication. The method may be performed by a UE. As shown in FIG. 16, the UE maintains a TTL and an FTL associated with unicast signals based only on received unicast signals (1502). In addition, the UE receives a multicast/broadcast signal (1504). Furthermore, the UE decodes the received multicast/broadcast signal based on the TTL and the FTL maintained based only on the received unicast signals (1506). While the UE refrains from updating the TTL and the FTL based on the received multicast/broadcast signal, the UE may still perform time and frequency offset estimation based on the received multicast/broadcast signal (see FIG. 10 as opposed to FIG. 9). In one configuration, the UE may maintain the TTL by determining a downlink timing for receiving the unicast signals, determining a timing offset with respect to the downlink timing for the received unicast signal, and adjusting the downlink timing based on the timing offset. Further, the UE may maintain the FTL by determining a carrier frequency for receiving the unicast signals, determining a frequency offset with respect to the carrier frequency for the received unicast signal, and adjusting a sampling frequency based on the frequency offset. In one configuration, the timing offset and the frequency offset may be determined based on at least one of CRS, CSI-RS, or UE-RS within the received unicast signals.

Figure 17:
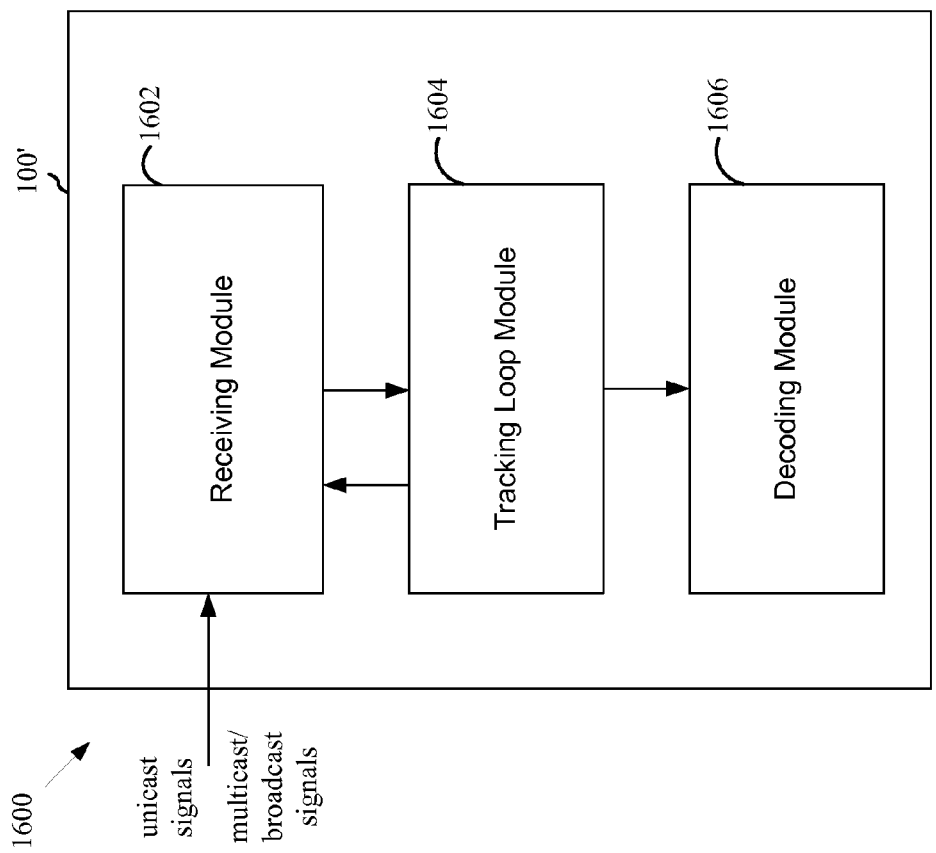
FIG. 17 is a conceptual block diagram illustrating the functionality of an exemplary apparatus.

FIG. 17 is a conceptual block diagram 1600 illustrating the functionality of an exemplary apparatus 100'. In a first configuration, the apparatus 100' includes a receiving module 1602 that receives unicast signals and multicast/broadcast signals. The received signals are provided to a tracking loop module 1604 that maintains a first set of tracking loops associated with unicast signals and maintains a second set of tracking loops associated with multicast/broadcast signals. The tracking loop module 1604 determines a plurality of timing offsets and frequency offsets and adjusts one or more DL timing values and one or more sampling frequency values. The updated one or more DL timing values and the one or more sampling frequency values are provided to the receiving module 1602, which adjusts an FFT window and a center frequency of the received unicast and multicast/broadcast signals. The received signals and the determined timing offsets and frequency offsets are provided to the decoding module 1606, which decodes at least one of a received unicast signal based on the first set of tracking loops or a received multicast/broadcast signal based on the second set of tracking loops.

In a second configuration, the apparatus 100' includes a receiving module 1602 that receives unicast signals and multicast/broadcast signals. The received signals are provided to a tracking loop module 1604 that maintains a TTL and an FTL associated with unicast signals and updates the TTL and the FTL based only on received unicast signals. The apparatus further includes a decoding module 1606 that is configured to decode a received multicast/broadcast signal based on the TTL and the FTL, which are maintained/updated based only on the received unicast signals.

The apparatus 100' may include additional modules that perform each of the steps of the algorithms in the aforementioned flow charts FIGS. 12-16. As such, each step in the aforementioned flow charts FIGS. 12-16 may be performed by a module and the apparatus 100' may include one or more of those modules. The modules may be the processing system 114, or otherwise, the same or different programmable or dedicated hardware configured to perform the functionality associated with each of the modules.

In one configuration, the apparatus 100 and/or 100' for wireless communication includes means for maintaining a first set of tracking loops associated with unicast signals, means for maintaining a second set of tracking loops associated with multicast/broadcast signals, and means for decoding at least one of a received unicast signal based on the first set of tracking loops or a received multicast/broadcast signal based on the second set of tracking loops. In one configuration, the first set of tracking loops includes a TTL and a FTL, and the apparatus further includes means for maintaining the TTL by determining a DL timing for receiving the unicast signals, means for determining a timing offset with respect to the DL timing for the received unicast signal, and means for adjusting the DL timing based on the timing offset. Furthermore, in such a configuration, the apparatus includes means for maintaining the FTL by determining a carrier frequency for receiving the unicast signals, means for determining a frequency offset with respect to the carrier frequency for the received unicast signal, and means for adjusting a sampling frequency based on the frequency offset.

In one configuration, the second set of tracking loops includes a TTL and an FTL, and the apparatus further includes means for maintaining the TTL by determining a DL timing for receiving the multicast/broadcast signals, means for determining a timing offset with respect to the DL timing for the received multicast/broadcast signal, and means for adjusting the DL timing based on the timing offset. Furthermore, the apparatus includes means for maintaining the FTL by determining a carrier frequency for receiving the multicast/broadcast signals, means for determining a frequency offset with respect to the carrier frequency for the received multicast/broadcast signal, and means for adjusting a sampling frequency based on the frequency offset.

In one configuration, the apparatus further includes means for maintaining the TTL and the FTL for each MBSFN area based on MBSFN reference signals within the multicast/broadcast signals from the MBSFN area. In one configuration, the unicast signals include unicast control information and unicast data, the first set of tracking loops includes a TTL and an FTL, and the apparatus further includes means for maintaining the TTL and the FTL for both the unicast control information and the unicast data. In one configuration, the unicast signals include unicast control information and unicast data, the first set of tracking loops includes a first TTL, a first FTL, a second TTL, and a second FTL, and the apparatus further includes means for maintaining the first TTL and the first FTL for the unicast control information, and means for maintaining the second TTL and the second FTL for the unicast data.

In one configuration, the first set of tracking loops includes a first TTL and a first FTL, the second set of tracking loops includes a second TTL and a second FTL, and the apparatus further includes means for determining a first DL timing and a first carrier frequency for receiving unicast signals and a second DL timing and a second carrier frequency for receiving multicast/broadcast signals. In addition, the apparatus includes means for determining a first timing offset with respect to the first DL timing for receiving the unicast signals, a first frequency offset with respect to the first carrier frequency for receiving the unicast signals, a second timing offset with respect to the second DL timing for receiving the multicast/broadcast signals, and a second frequency offset with respect to the second carrier frequency for receiving the multicast/broadcast signals. In addition, the apparatus includes means for decoding at least one of the received unicast signal based on the first timing offset and the first frequency offset or the received multicast/broadcast signal based on the second timing offset and the second frequency offset. Furthermore, the apparatus includes means for adjusting the first DL timing, a first sampling frequency, the second DL timing, and a second sampling frequency by adjusting the first DL timing within the first TTL, adjusting the first sampling frequency within the first FTL, adjusting the second DL timing within the second TTL, and adjusting the second sampling frequency within the second FTL.

Additional means may be performed by any of the steps of the aforementioned algorithms of FIGS. 12-15. The aforementioned algorithms may be performed and the aforementioned means may be one or more of the aforementioned modules of the apparatus 100' of FIG. 17 and/or the processing system 114 of FIG. 1 configured to perform the functions recited by the aforementioned means. As described supra, the processing system 114 includes the TX Processor 768, the RX Processor 756, and the controller/processor 759. As such, in one configuration, the aforementioned means may be the TX Processor 768, the RX Processor 756, and the controller/processor 759 configured to perform the functions recited by the aforementioned means.

In one configuration, the apparatus 100 and/or 100' for wireless communication includes means for maintaining a TTL and an FTL associated with unicast signals based only on received unicast signals. In addition, the apparatus includes means for receiving a multicast/broadcast signal and means for decoding the received multicast/broadcast signal based on the TTL and the FTL maintained based only on the received unicast signals. The aforementioned means may be one or more of the aforementioned modules of the apparatus 100' of FIG. 17 and/or the processing system 114 of FIG. 1 configured to perform the functions recited by the aforementioned means. As described supra, the processing system 114 includes the TX Processor 768, the RX Processor 756, and the controller/processor 759. As such, in one configuration, the aforementioned means may be the TX Processor 768, the RX Processor 756, and the controller/processor 759 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
  maintaining a first set of tracking loops associated with unicast signals, the first set of tracking loops comprising a time tracking loop (TTL) and a frequency tracking loop (FTL), the TTL being maintained based on a timing offset and the FTL being maintained based on a frequency offset;
  maintaining a second set of tracking loops associated with multicast/broadcast signals; and
  decoding at least one of a received unicast signal based on the first set of tracking loops or a received multicast/broadcast signal based on the second set of tracking loops,
  wherein the timing offset and the frequency offset are based on at least one of cell-specific reference signals (CRS), channel state information reference signals (CSI-RS), or user equipment specific reference signals (UE-RS) within the received unicast signal.

2. The method of claim 1, further comprising:
  maintaining the TTL by determining a downlink timing for receiving the unicast signals, determining the timing offset with respect to the downlink timing for the received unicast signal, and adjusting the downlink timing based on the timing offset; and
  maintaining the FTL by determining a carrier frequency for receiving the unicast signals, determining the frequency offset with respect to the carrier frequency for the received unicast signal, and adjusting a sampling frequency based on the frequency offset.

3. The method of claim 1, wherein the second set of tracking loops comprises a second time tracking loop (TTL) and a second frequency tracking loop (FTL), and the method further comprises:
  maintaining the second TTL by determining a downlink timing for receiving the multicast/broadcast signals, determining a second timing offset with respect to the downlink timing for the received multicast/broadcast signal, and adjusting the downlink timing based on the second timing offset; and
  maintaining the second FTL by determining a carrier frequency for receiving the multicast/broadcast signals, determining a second frequency offset with respect to the carrier frequency for the received multicast/broadcast signal, and adjusting a sampling frequency based on the second frequency offset.

4. The method of claim 3, wherein the second timing offset and the second frequency offset are determined based on multi-media broadcast over single frequency network (MBSFN) reference signals within the received multicast/broadcast signal.

5. The method of claim 3, wherein the received multicast/broadcast signal is received from a plurality of multi-media broadcast over single frequency network (MBSFN) areas, the second timing offset is a composite timing offset of the received multicast/broadcast signal from each of the MBSFN areas, and the second frequency offset is a composite frequency offset of the received multicast/broadcast signal from each of the MBSFN areas.

6. The method of claim 1, wherein the first set of tracking loops comprises the TTL and the FTL for each carrier on which the unicast signals are received.

7. The method of claim 1, wherein the second set of tracking loops comprises a second TTL and a second FTL for each carrier on which the multicast/broadcast signals are received.

8. The method of claim 1, wherein the received multicast/broadcast signal is received from a plurality of multi-media broadcast over single frequency network (MBSFN) areas, and the second set of tracking loops comprises a second TTL and a second FTL for each of the MBSFN areas.

9. The method of claim 8, wherein the method further comprises maintaining the second TTL and the second FTL for each MBSFN area based on MBSFN reference signals within the multicast/broadcast signals from the MBSFN area.

10. The method of claim 1, wherein the unicast signals comprise unicast control information and unicast data, the method further comprises maintaining the TTL and the FTL for both the unicast control information and the unicast data.

11. The method of claim 10, wherein the unicast control information is received in both MBSFN subframes and non-MBSFN subframes.

12. The method of claim 1, wherein the unicast signals comprise unicast control information and unicast data, the first set of tracking loops further comprises a second TTL and a second FTL, and the method further comprises:
   maintaining the TTL and the FTL for the unicast control information; and
   maintaining the second TTL and the second FTL for the unicast data.

13. The method of claim 12, wherein the TTL and the FTL are maintained based on at least one of the CRS or CSI-RS within the unicast control information, and the second TTL and the second FTL are maintained based on the UE-RS within the unicast data.

14. The method of claim 1, wherein the first set of tracking loops are maintained based on the unicast signals received from a set of cells, wherein the TTL is
   for tracking the timing offset of unicast signals received from at least one cell with respect to a downlink timing, and the FTL is
   for tracking the frequency offset of unicast signals received from at least one cell with respect to a carrier frequency on which the unicast signals are received, and
   wherein when the at least one cell comprises a plurality of cells, the timing offset is a composite timing offset of the unicast signals received from each cell in the plurality of cells and the frequency offset is a composite frequency offset of the unicast signals received from each cell in the plurality of cells.

15. The method of claim 1, wherein the second set of tracking loops are maintained based on the multicast/broadcast signals received from at least one cell, and the second set of tracking loops comprises:
   at least a second TTL for tracking a second timing offset of multicast/broadcast signals received from the at least one cell with respect to a downlink timing, and
   at least a second FTL for tracking a second frequency offset of multicast/broadcast signals received from the at least one cell with respect to a carrier frequency on which the multicast/broadcast signals are received,
   wherein when the at least one cell comprises a plurality of cells, the second timing offset is a composite timing offset of the multicast/broadcast signals received from each cell in the plurality of cells and the second frequency offset is a composite frequency offset of the multicast/broadcast signals received from each cell in the plurality of cells.

16. The method of claim 1, the second set of tracking loops comprise a second TTL and a second FTL, and the method further comprises:
   determining a first downlink timing and a first carrier frequency for receiving unicast signals and a second downlink timing and a second carrier frequency for receiving multicast/broadcast signals;
   determining the timing offset with respect to the first downlink timing for receiving the unicast signals, the frequency offset with respect to the first carrier frequency for receiving the unicast signals, a second timing offset with respect to the second downlink timing for receiving the multicast/broadcast signals, and a second frequency offset with respect to the second carrier frequency for receiving the multicast/broadcast signals;
   decoding at least one of the received unicast signal based on the timing offset and the frequency offset or the received multicast/broadcast signal based on the second timing offset and the second frequency offset; and
   adjusting the first downlink timing, a first sampling frequency, the second downlink timing, and a second sampling frequency by adjusting the first downlink timing within the TTL, adjusting the first sampling frequency within the FTL, adjusting the second downlink timing within the second TTL, and adjusting the second sampling frequency within the second FTL.

17. A method of wireless communication, comprising:
   maintaining a time tracking loop (TTL) and a frequency tracking loop (FTL) associated with unicast signals based only on received unicast signals, the TTL being maintained based on a timing offset and the FTL being maintained based on a frequency offset;
   receiving a multicast/broadcast signal; and
   decoding the received multicast/broadcast signal based on the TTL and the FTL maintained based only on the received unicast signals,
   wherein the timing offset and the frequency offset are based on at least one of cell-specific reference signals (CRS), channel state information reference signals (CSI-RS), or user equipment specific reference signals (UE-RS) within the received unicast signals.

18. The method of claim 17, wherein the maintaining the TTL and the FTL comprises:
   maintaining the TTL by determining a downlink timing for receiving the unicast signals, determining the timing offset with respect to the downlink timing for the received unicast signal, and adjusting the downlink timing based on the timing offset; and
   maintaining the FTL by determining a carrier frequency for receiving the unicast signals, determining the frequency offset with respect to the carrier frequency for the received unicast signal, and adjusting a sampling frequency based on the frequency offset.

19. An apparatus for wireless communication, comprising:
   means for maintaining a first set of tracking loops associated with unicast signals, the first set of tracking loops comprising a time tracking loop (TTL) and a frequency tracking loop (FTL), the TTL being maintained based on a timing offset and the FTL being maintained based on a frequency offset;
   means for maintaining a second set of tracking loops associated with multicast/broadcast signals; and
   means for decoding at least one of a received unicast signal based on the first set of tracking loops or a received multicast/broadcast signal based on the second set of tracking loops,
   wherein the timing offset and the frequency offset are based on at least one of cell-specific reference signals (CRS), channel state information reference signals (CSI-RS), or user equipment specific reference signals (UE-RS) within the received unicast signal.

20. The apparatus of claim 19, further comprising:
   means for maintaining the TTL by determining a downlink timing for receiving the unicast signals, means for determining the timing offset with respect to the downlink timing for the received unicast signal, and means for adjusting the downlink timing based on the timing offset; and means for maintaining the FTL by determining a carrier frequency for receiving the unicast signals, means for determining the frequency offset with respect to the carrier frequency for the received unicast signal, and means for adjusting a sampling frequency based on the frequency offset.

21. The apparatus of claim 19, wherein the second set of tracking loops comprises a second time tracking loop (TTL) and a second frequency tracking loop (FTL), and the apparatus further comprises:
means for maintaining the second TTL by determining a downlink timing for receiving the multicast/broadcast signals, means for determining a second timing offset with respect to the downlink timing for the received multicast/broadcast signal, and means for adjusting the downlink timing based on the second timing offset; and
means for maintaining the second FTL by determining a carrier frequency for receiving the multicast/broadcast signals, means for determining a second frequency offset with respect to the carrier frequency for the received multicast/broadcast signal, and means for adjusting a sampling frequency based on the second frequency offset.

22. The apparatus of claim 21, wherein the second timing offset and the second frequency offset are determined based on multi-media broadcast over single frequency network (MBSFN) reference signals within the received multicast/broadcast signal.

23. The apparatus of claim 21, wherein the received multicast/broadcast signal is received from a plurality of multimedia broadcast over single frequency network (MBSFN) areas, the second timing offset is a composite timing offset of the received multicast/broadcast signal from each of the MBSFN areas, and the second frequency offset is a composite frequency offset of the received multicast/broadcast signal from each of the MBSFN areas.

24. The apparatus of claim 19, wherein the first set of tracking loops comprises the TTL and the FTL for each carrier on which the unicast signals are received.

25. The apparatus of claim 19, wherein the second set of tracking loops comprises a second TTL and a second FTL for each carrier on which the multicast/broadcast signals are received.

26. The apparatus of claim 19, wherein the received multicast/broadcast signal is received from a plurality of multimedia broadcast over single frequency network (MBSFN) areas, and the second set of tracking loops comprises a second TTL and a second FTL for each of the MBSFN areas.

27. The apparatus of claim 26, wherein the apparatus further comprises means for maintaining the second TTL and the second FTL for each MBSFN area based on MBSFN reference signals within the multicast/broadcast signals from the MBSFN area.

28. The apparatus of claim 19, wherein the unicast signals comprise unicast control information and unicast data, the apparatus further comprises means for maintaining the TTL and the FTL for both the unicast control information and the unicast data.

29. The apparatus of claim 28, wherein the unicast control information is received in both MBSFN subframes and non-MBSFN subframes.

30. The apparatus of claim 19, wherein the unicast signals comprise unicast control information and unicast data, the first set of tracking loops further comprises a second TTL and a second FTL, and the apparatus further comprises:
means for maintaining the TTL and the FTL for the unicast control information; and
means for maintaining the second TTL and the second FTL for the unicast data.

31. The apparatus of claim 30, wherein the first TTL and the first FTL are maintained based on at least one of the CRS or CSI-RS within the unicast control information, and the second TTL and the second FTL are maintained based on the UE-RS within the unicast data.

32. The apparatus of claim 19, wherein the first set of tracking loops are maintained based on the unicast signals received from a set of cells, wherein the TTL is
for tracking the timing offset of unicast signals received from at least one cell with respect to a downlink timing, and the FTL is
for tracking the frequency offset of unicast signals received from at least one cell with respect to a carrier frequency on which the unicast signals are received, and
wherein when the at least one cell comprises a plurality of cells, the timing offset is a composite timing offset of the unicast signals received from each cell in the plurality of cells and the frequency offset is a composite frequency offset of the unicast signals received from each cell in the plurality of cells.

33. The apparatus of claim 19, wherein the second set of tracking loops are maintained based on the multicast/broadcast signals received from at least one cell, and the second set of tracking loops comprises:
at least a second TTL for tracking a second timing offset of multicast/broadcast signals received from the at least one cell with respect to a downlink timing, and
at least a second FTL for tracking a second frequency offset of multicast/broadcast signals received from the at least one cell with respect to a carrier frequency on which the multicast/broadcast signals are received,
wherein when the at least one cell comprises a plurality of cells, the second timing offset is a composite timing offset of the multicast/broadcast signals received from each cell in the plurality of cells and the second frequency offset is a composite frequency offset of the multicast/broadcast signals received from each cell in the plurality of cells.

34. The apparatus of claim 19, wherein the second set of tracking loops comprise a second TTL and a second FTL, and the apparatus further comprises:
means for determining a first downlink timing and a first carrier frequency for receiving unicast signals and a second downlink timing and a second carrier frequency for receiving multicast/broadcast signals;
means for determining the timing offset with respect to the first downlink timing for receiving the unicast signals, the frequency offset with respect to the first carrier frequency for receiving the unicast signals, a second timing offset with respect to the second downlink timing for receiving the multicast/broadcast signals, and a second frequency offset with respect to the second carrier frequency for receiving the multicast/broadcast signals;
means for decoding at least one of the received unicast signal based on the timing offset and the frequency offset or the received multicast/broadcast signal based on the second timing offset and the second frequency offset; and
means for adjusting the first downlink timing, a first sampling frequency, the second downlink timing, and a second sampling frequency by adjusting the first downlink timing within the TTL, adjusting the first sampling frequency within the FTL, adjusting the second downlink timing within the second TTL, and adjusting the second sampling frequency within the second FTL.

35. An apparatus for wireless communication, comprising:
means for maintaining a time tracking loop (TTL) and a frequency tracking loop (FTL) associated with unicast signals based only on received unicast signals, the TTL being maintained based on a timing offset and the FTL being maintained based on a frequency offset;
means for receiving a multicast/broadcast signal; and
means for decoding the received multicast/broadcast signal based on the TTL and the FTL maintained based only on the received unicast signals,
wherein the timing offset and the frequency offset are based on at least one of cell-specific reference signals (CRS), channel state information reference signals (CSI-RS), or user equipment specific reference signals (UE-RS) within the received unicast signals.

36. The apparatus of claim 35, wherein the means for maintaining the TTL and the FTL is configured to:
maintain the TTL by determining a downlink timing for receiving the unicast signals, determining the timing offset with respect to the downlink timing for the received unicast signal, and adjusting the downlink timing based on the timing offset; and
maintain the FTL by determining a carrier frequency for receiving the unicast signals, determining the frequency offset with respect to the carrier frequency for the received unicast signal, and adjusting a sampling frequency based on the frequency offset.

37. An apparatus for wireless communication, comprising:
a processing system configured to:
maintain a first set of tracking loops associated with unicast signals, the first set of tracking loops comprising a time tracking loop (TTL) and a frequency tracking loop (FTL), the TTL being maintained based on a timing offset and the FTL being maintained based on a frequency offset;
maintain a second set of tracking loops associated with multicast/broadcast signals; and
decode at least one of a received unicast signal based on the first set of tracking loops or a received multicast/broadcast signal based on the second set of tracking loops,
wherein the timing offset and the frequency offset are based on at least one of cell-specific reference signals (CRS), channel state information reference signals (CSI-RS), or user equipment specific reference signals (UE-RS) within the received unicast signal.

38. The apparatus of claim 37, the processing system further configured to:
maintain the TTL by determining a downlink timing for receiving the unicast signals, determine the timing offset with respect to the downlink timing for the received unicast signal, and adjust the downlink timing based on the timing offset; and
maintain the FTL by determining a carrier frequency for receiving the unicast signals, determine the frequency offset with respect to the carrier frequency for the received unicast signal, and adjust a sampling frequency based on the frequency offset.

39. The apparatus of claim 37, wherein the second set of tracking loops comprises a second time tracking loop (TTL) and a second frequency tracking loop (FTL), and the processing system is further configured to:
maintain the second TTL by determining a downlink timing for receiving the multicast/broadcast signals, determine a second timing offset with respect to the downlink timing for the received multicast/broadcast signal, and adjust the downlink timing based on the timing offset; and
maintain the second FTL by determining a carrier frequency for receiving the multicast/broadcast signals, determine a second frequency offset with respect to the carrier frequency for the received multicast/broadcast signal, and adjust a sampling frequency based on the second frequency offset.

40. The apparatus of claim 39, wherein the second timing offset and the second frequency offset are determined based on multi-media broadcast over single frequency network (MBSFN) reference signals within the received multicast/broadcast signal.

41. The apparatus of claim 39, wherein the received multicast/broadcast signal is received from a plurality of multi-media broadcast over single frequency network (MBSFN) areas, the second timing offset is a composite timing offset of the received multicast/broadcast signal from each of the MBSFN areas, and the second frequency offset is a composite frequency offset of the received multicast/broadcast signal from each of the MBSFN areas.

42. The apparatus of claim 37, wherein the first set of tracking loops comprises the TTL and the FTL for each carrier on which the unicast signals are received.

43. The apparatus of claim 37, wherein the second set of tracking loops comprises a second TTL and a second FTL for each carrier on which the multicast/broadcast signals are received.

44. The apparatus of claim 37, wherein the received multicast/broadcast signal is received from a plurality of multi-media broadcast over single frequency network (MBSFN) areas, and the second set of tracking loops comprises a second TTL and a second FTL for each of the MBSFN areas.

45. The apparatus of claim 44, wherein the processing system is further configured to maintain the second TTL and the second FTL for each MBSFN area based on MBSFN reference signals within the multicast/broadcast signals from the MBSFN area.

46. The apparatus of claim 37, wherein the unicast signals comprise unicast control information and unicast data, and the processing system is further configured to maintain the TTL and the FTL for both the unicast control information and the unicast data.

47. The apparatus of claim 46, wherein the unicast control information is received in both MBSFN subframes and non-MBSFN subframes.

48. The apparatus of claim 37, wherein the unicast signals comprise unicast control information and unicast data, the first set of tracking loops further comprises a second TTL and a second FTL, and the processing system is further configured to:
maintain the TTL and the FTL for the unicast control information; and
maintain the second TTL and the second FTL for the unicast data.

49. The apparatus of claim 48, wherein the first TTL and the first FTL are maintained based on at least one of the CRS or CSI-RS within the unicast control information, and the second TTL and the second FTL are maintained based on the UE-RS within the unicast data.

50. The apparatus of claim 37, wherein the first set of tracking loops are maintained based on the unicast signals received from a set of cells, wherein the TTL is:
for tracking the timing offset of unicast signals received from at least one cell with respect to a downlink timing, and the FTL is
for tracking the frequency offset of unicast signals received from at least one cell with respect to a carrier frequency on which the unicast signals are received, and wherein when the at least one cell comprises a plurality of cells, the timing offset is a composite timing offset of the unicast signals received from each cell in the plurality of cells and the frequency offset is a composite frequency offset of the unicast signals received from each cell in the plurality of cells.

51. The apparatus of claim 37, wherein the second set of tracking loops are maintained based on the multicast/broadcast signals received from at least one cell, and the second set of tracking loops comprises:
at least a second TTL for tracking a second timing offset of multicast/broadcast signals received from the at least one cell with respect to a downlink timing, and
at least a second FTL) for tracking a second frequency offset of multicast/broadcast signals received from the at least one cell with respect to a carrier frequency on which the multicast/broadcast signals are received,
wherein when the at least one cell comprises a plurality of cells, the second timing offset is a composite timing offset of the multicast/broadcast signals received from each cell in the plurality of cells and the second frequency offset is a composite frequency offset of the multicast/broadcast signals received from each cell in the plurality of cells.

52. The apparatus of claim 37, the second set of tracking loops comprises a second TTL and a second FTL, and the processing system is further configured to:
determine a first downlink timing and a first carrier frequency for receiving unicast signals and a second downlink timing and a second carrier frequency for receiving multicast/broadcast signals;
determine the timing offset with respect to the first downlink timing for receiving the unicast signals, the frequency offset with respect to the first carrier frequency for receiving the unicast signals, a second timing offset with respect to the second downlink timing for receiving the multicast/broadcast signals, and a second frequency offset with respect to the second carrier frequency for receiving the multicast/broadcast signals;
decode at least one of the received unicast signal based on the timing offset and the frequency offset or the received multicast/broadcast signal based on the second timing offset and the second frequency offset; and
adjust the first downlink timing, a first sampling frequency, the second downlink timing, and a second sampling frequency by adjusting the first downlink timing within the TTL, adjusting the first sampling frequency within the FTL, adjusting the second downlink timing within the second TTL, and adjusting the second sampling frequency within the second FTL.

53. An apparatus for wireless communication, comprising:
a processing system configured to:
maintain a time tracking loop (TTL) and a frequency tracking loop (FTL) associated with unicast signals based only on received unicast signals, the TTL being maintained based on a timing offset and the FTL being maintained based on a frequency offset;
receive a multicast/broadcast signal; and
decode the received multicast/broadcast signal based on the TTL and the FTL maintained based only on the received unicast signals,
wherein the timing offset and the frequency offset are based on at least one of cell-specific reference signals (CRS), channel state information reference signals (CSI-RS), or user equipment specific reference signals (UE-RS) within the received unicast signals.

54. The apparatus of claim 53, wherein to maintain the TTL and the FTL, the processing system is configured to:
maintain the TTL by determining a downlink timing for receiving the unicast signals, determining the timing offset with respect to the downlink timing for the received unicast signal, and adjusting the downlink timing based on the timing offset; and
maintain the FTL by determining a carrier frequency for receiving the unicast signals, determining the frequency offset with respect to the carrier frequency for the received unicast signal, and adjusting a sampling frequency based on the frequency offset.

55. A computer program product, comprising:
a non-transitory computer-readable medium comprising code for:
maintaining a first set of tracking loops associated with unicast signals, the first set of tracking loops comprising a time tracking loop (TTL) and a frequency tracking loop (FTL), the TTL being maintained based on a timing offset and the FTL being maintained based on a frequency offset;
maintaining a second set of tracking loops associated with multicast/broadcast signals; and
decoding at least one of a received unicast signal based on the first set of tracking loops or a received multicast/broadcast signal based on the second set of tracking loops,
wherein the timing offset and the frequency offset are based on at least one of cell-specific reference signals (CRS), channel state information reference signals (CSI-RS), or user equipment specific reference signals (UE-RS) within the received unicast signal.

56. A computer program product, comprising:
a non-transitory computer-readable medium comprising code for:
maintaining a time tracking loop (TTL) and a frequency tracking loop (FTL) associated with unicast signals based only on received unicast signals, the TTL being maintained based on a timing offset and the FTL being maintained based on a frequency offset;
receiving a multicast/broadcast signal; and
decoding the received multicast/broadcast signal based on the TTL and the FTL maintained based only on the received unicast signals,
wherein the timing offset and the frequency offset are based on at least one of cell-specific reference signals (CRS), channel state information reference signals (CSI-RS), or user equipment specific reference signals (UE-RS) within the received unicast signals.

* * * * *